US011861307B2

(12) United States Patent
Asao et al.

(10) Patent No.: US 11,861,307 B2
(45) Date of Patent: Jan. 2, 2024

(54) REQUEST PARAPHRASING SYSTEM, REQUEST PARAPHRASING MODEL AND REQUEST DETERMINING MODEL TRAINING METHOD, AND DIALOGUE SYSTEM

(71) Applicant: National Institute of Information and Communications Technology, Tokyo (JP)

(72) Inventors: Yoshihiko Asao, Tokyo (JP); Ryu Iida, Tokyo (JP); Canasai Kruengkrai, Tokyo (JP); Noriyuki Abe, Tokyo (JP); Kanako Onishi, Tokyo (JP); Kentaro Torisawa, Tokyo (JP); Yutaka Kidawara, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 659 days.

(21) Appl. No.: 17/043,069

(22) PCT Filed: Mar. 5, 2019

(86) PCT No.: PCT/JP2019/008607
§ 371 (c)(1),
(2) Date: Sep. 29, 2020

(87) PCT Pub. No.: WO2019/198386
PCT Pub. Date: Oct. 17, 2019

(65) Prior Publication Data
US 2021/0034817 A1 Feb. 4, 2021

(30) Foreign Application Priority Data

Apr. 13, 2018 (JP) .................................. 2018-077454

(51) Int. Cl.
*G06F 40/30* (2020.01)
*G06F 40/268* (2020.01)
(Continued)

(52) U.S. Cl.
CPC ............ *G06F 40/268* (2020.01); *G06F 40/58* (2020.01); *G06N 3/04* (2013.01); *G06N 3/08* (2013.01)

(58) Field of Classification Search
CPC .... G06F 40/211; G06F 40/253; G06F 40/268; G06F 40/284; G06F 40/30; G06F 40/58;
(Continued)

(56) References Cited

U.S. PATENT DOCUMENTS 7,519,529 B1 *  4/2009  Horvitz .................. G06F 16/35
369/30.04
9,602,987 B1 *  3/2017  Wittig ..................... H04W 4/14
(Continued)

FOREIGN PATENT DOCUMENTS

JP    2004-094521 A    3/2004
JP    2015-087796 A    5/2015
(Continued)

OTHER PUBLICATIONS

Li et al., Question answering over freebase with multi-column convolutional neural networks, Proceedings of the 53rd Annual Meeting of the Association for Computational Linguistics and the 7th International Joint Conference on Natural Language Processing, vol. 1, pages={260-269}, year={2015} (Year: 2015).*
(Continued)

*Primary Examiner* — Lamont M Spooner
(74) *Attorney, Agent, or Firm* — Renner, Otto, Boisselle & Sklar, LLP

(57) ABSTRACT

A request paraphrasing system 120 allowing a dialogue system to flexibly address to requests in various different
(Continued)

manners of expression includes: a pre-processing unit 130 converting a user input 56 to a word vector sequence; and a neural paraphrasing model 94 trained in advance by machine learning to receive the word vector sequence as an input and paraphrasing a request represented by the word vector sequence to a request having a higher probability of obtaining an answer from a question-answering device 122 than the request before paraphrasing. As pre-processing, whether the user input 56 is a request or not may be determined and it may be paraphrased only when it is determined to be a request. Further, a classification model 98 may classify the input request to determine to which request class it belongs, and the classification may be input as one feature to neural paraphrasing model 94.

3 Claims, 10 Drawing Sheets

(51) Int. Cl.
  *G06N 3/08* (2023.01)
  *G06F 40/58* (2020.01)
  *G06N 3/04* (2023.01)
(58) Field of Classification Search
  CPC .......... G06F 40/44; G06F 40/45; G06F 40/47; G06N 3/08; G06N 3/09; G10L 15/00
  See application file for complete search history.

(56) References Cited

U.S. PATENT DOCUMENTS

| | | | | |
|---|---|---|---|---|
| 9,812,151 | B1* | 11/2017 | Amini | G06T 13/40 |
| 9,830,315 | B1* | 11/2017 | Xiao | G06F 40/30 |
| 9,830,556 | B2* | 11/2017 | Maarek | G06F 16/951 |
| 10,002,177 | B1* | 6/2018 | McClintock | G06F 16/24575 |
| 10,318,586 | B1* | 6/2019 | Rose | G06F 16/285 |
| 10,380,154 | B2* | 8/2019 | Boxwell | G06N 5/04 |
| 10,431,205 | B2* | 10/2019 | Le | G06F 40/35 |
| 10,810,193 | B1* | 10/2020 | Subramanya | G06F 16/243 |
| 11,669,691 | B2* | 6/2023 | Okajima | G06F 40/35 704/9 |
| 2008/0040339 | A1* | 2/2008 | Zhou | G06F 16/3334 707/999.005 |
| 2008/0319962 | A1* | 12/2008 | Riezler | G06F 16/3338 |
| 2009/0168741 | A1* | 7/2009 | Masuda | H04L 67/52 370/343 |
| 2010/0010803 | A1* | 1/2010 | Ishikawa | G06F 40/247 704/9 |
| 2011/0125734 | A1* | 5/2011 | Duboue | G09B 7/00 707/723 |
| 2012/0078888 | A1* | 3/2012 | Brown | G06F 16/284 707/723 |
| 2013/0346496 | A1* | 12/2013 | Maarek | G06Q 50/01 709/204 |
| 2016/0246791 | A1* | 8/2016 | Long | G06F 16/24578 |
| 2016/0283491 | A1* | 9/2016 | Lu | G06F 16/3322 |
| 2017/0109355 | A1 | 4/2017 | Li | |
| 2017/0169355 | A1* | 6/2017 | Boyer | G06F 40/30 |
| 2017/0177715 | A1* | 6/2017 | Chang | G06N 5/04 |
| 2017/0242915 | A1* | 8/2017 | Torisawa | G06F 16/3329 |
| 2017/0249595 | A1* | 8/2017 | Krupa | G06Q 30/0201 |
| 2017/0302613 | A1* | 10/2017 | Imbrie | H04L 51/226 |
| 2017/0323636 | A1* | 11/2017 | Xiao | G06N 3/044 |
| 2018/0075162 | A1* | 3/2018 | Ni | G06F 16/24578 |
| 2018/0329982 | A1* | 11/2018 | Patel | G06F 40/211 |
| 2018/0341871 | A1* | 11/2018 | Maitra | G06N 3/042 |
| 2018/0367483 | A1* | 12/2018 | Rodriguez | H04L 51/046 |
| 2018/0367484 | A1* | 12/2018 | Rodriguez | H04L 67/75 |
| 2019/0188257 | A1 | 6/2019 | Ida | |
| 2019/0260694 | A1* | 8/2019 | Londhe | H04L 51/216 |

FOREIGN PATENT DOCUMENTS

| | | |
|---|---|---|
| JP | 2016-024600 A | 2/2016 |
| JP | 2017-076403 A | 4/2017 |
| JP | 2018-041160 A | 3/2018 |
| JP | 2018-060273 A | 4/2018 |

OTHER PUBLICATIONS

Nio et al., Improving the robustness of example-based dialog retrieval using recursive neural network paraphrase identification, ooktitle={2014 IEEE Spoken Language Technology Workshop (SLT)}, pages=306-311, 2014, IEEEE (Year: 2014).*

Ma et al., Query and output: Generating words by querying distributed word representations for paraphrase generation, journal={arXiv preprint arXiv:1803.01465}, year={2018}, pp. 1-11. (Year: 2018).*

Vineet, title={A survey of neural network techniques for feature extraction from text}, journal={arXiv preprint arXiv:1704.08531}, year={2017}, pp. 1-9. (Year: 2017).*

International Search Report for corresponding Application No. PCT/JP2019/008607, dated Jun. 11, 2019.

* cited by examiner

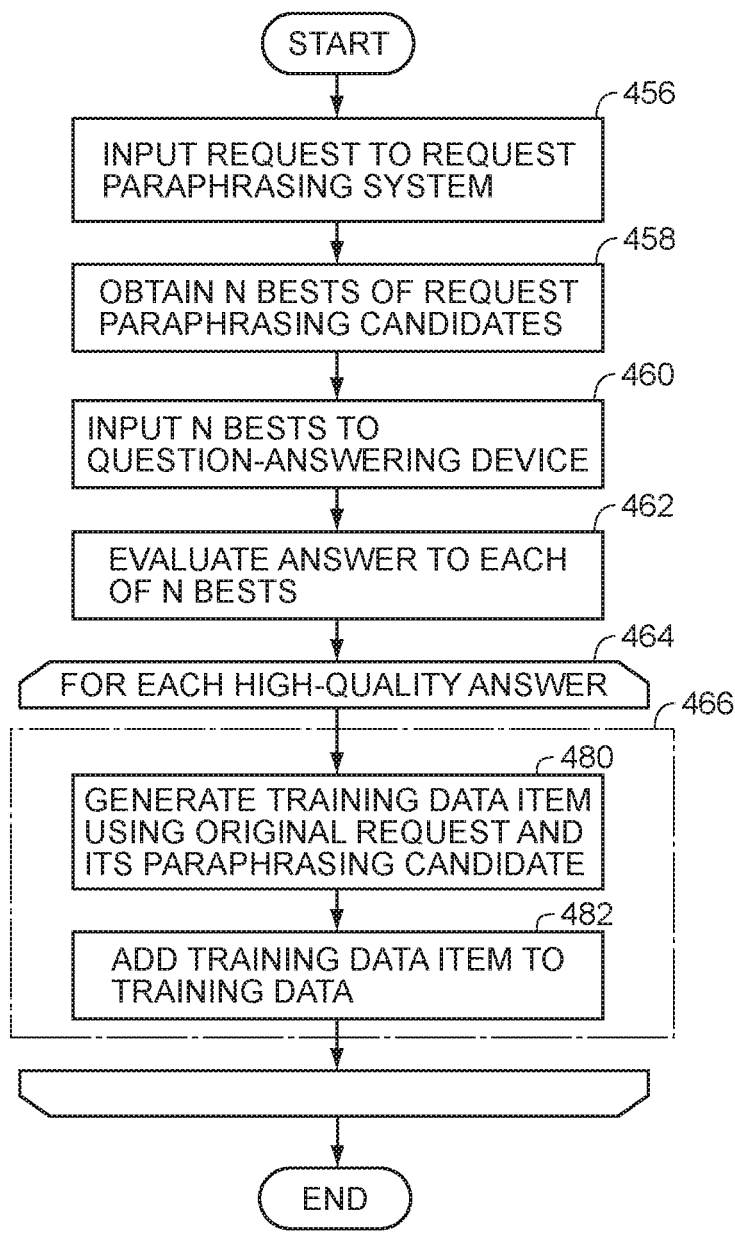

REQUEST PARAPHRASING SYSTEM, REQUEST PARAPHRASING MODEL AND REQUEST DETERMINING MODEL TRAINING METHOD, AND DIALOGUE SYSTEM

TECHNICAL FIELD

The present invention relates to natural language processing and, more specifically, to a request paraphrasing system, a request paraphrasing model and a request paraphrasing model training method, as well as to a dialogue system, that can improve the probability of obtaining a right response to a request in a question-answering system, a dialogue system and the like.

BACKGROUND ART

Recently, question-answering systems and dialogue systems (hereinafter collectively and simply referred to as "dialogue systems") are being developed vigorously. A technique attracting much attention is a so-called smart speaker that interacts with a user in a natural language using speech recognition and synthesized speech. A dialogue system provides a computer with a human-like dialogue interface and hence it is convenient. A dialogue system is not only convenient but also giving relief to a human life by sometimes responding to a human utterance in an unexpected manner. Since the systems are highly compatible with the Internet, the dialogue systems will be used widely in society in the future.

Though the current dialogue system is capable of responding to sentences in a natural language, accurate responses are possible only to limited types of inputs having relatively simple formats. By way of example, a dialogue system that can give an answer to a question, "What can I make from eggs?" may not possibly give an answer to an input "There are some surplus eggs and I wonder what to make using them?" though the requested information as the answer is almost the same. Therefore, currently, users are required to somehow learn the knack of the dialogue system and to carefully choose expressions in order for the dialogue system to fully deliver its performance.

Patent Literature 1 listed below proposes a solution to such a problem. The system disclosed in Patent Literature 1 specifies, before answering to a question, to which domain the question belongs. Specifically, from the question, the system specifies an entity as the subject of the question. Then, the perplexity of the question sentence is calculated using a language model, assuming a specific domain. By comparing the perplexity with a threshold that is determined dependent on whether the entity is specified or not, the system determines whether the question belongs to that specific domain or not. According to Patent Literature 1, a right answer will be given when the domain of the question is specified in this manner.

CITATION LIST

Patent Literature

PTL 1: JP2015-087796A

SUMMARY OF INVENTION

Technical Problem

By the technique described in Patent Literature 1, questions can be classified by certain criteria. The claim that classification of a question leads to a better answer to the question sounds plausible. The technique disclosed in Patent Literature 1, however, is difficult to apply to natural language sentences freely generated as in the case of human utterances. Utterances of natural language sentences tend to decrease the reliability of the classification itself and, in addition, because natural languages allow various and many different expressions, when inputs are received in the form of natural language sentences, it is highly unlikely that right answers are given, even if these inputs could be processed by the dialogue system in the right domains. Such a problem is encountered not only when a simple answer to a question is requested but also when some more generalized responses are requested to an input. Here, an input requesting an answer to a question or a response to an utterance as well as an input to a system requesting any response including a specific operation will be referred to as a "request." For example, an instruction to a system that instructs linked software or a so-called IoT (Internet of Things) device to do an operation is considered to be a request. In the present specification, a system that responds to a request received through a dialogue will be referred to as a dialogue system. For a dialogue system to adequately respond to requests in various natural language sentences, simple classification of requests is insufficient, and some other approaches are necessary.

Therefore, a main object of the present invention is to provide a request paraphrasing system, a request paraphrasing model, and a request determination model training method that are used for a dialogue system to enable the dialogue system to flexibly respond to various requests in different manners of expressions, as well as to a dialogue system that can flexibly respond to such requests.

Solution to Problem

According to a first aspect, the present invention provides a request paraphrasing system, including: a morphological analysis means for morphologically analyzing an input request and thereby converting it to a morpheme sequence; a converting means for converting each word in the morpheme sequence to a word vector and thereby converting the morpheme sequence to an input word vector sequence; and a request paraphrasing model trained in advance by machine learning configured to receive the input word vector sequence as an input, to convert the request represented by the input word vector sequence to an output word sequence corresponding to a request having a higher probability of getting a right response from a prescribed dialogue system than the input word vector sequence. The output word sequence output from the request paraphrasing model is applied to the dialogue system as a request.

Preferably, the request paraphrasing system further includes a request classification means for classifying the input request to one of a predetermined plurality of request classes and outputting a corresponding classification code. The request paraphrasing model includes a classification-added request paraphrasing model trained in advance by machine learning configured to receive the input word vector sequence and the classification code as inputs, and to convert the request represented by the input word vector sequence to an output word sequence corresponding to a request having a higher probability of getting a right response from a prescribed dialogue system than the input word vector sequence.

According to a second aspect, the present invention provides a request paraphrasing model training method for training through machine learning a request paraphrasing model configured to receive the input word vector sequence as an input, and to convert the request represented by the input word vector sequence to an output word sequence corresponding to a request having a higher probability of getting a right response from a prescribed dialogue system than the input word vector sequence. The method includes the step of a computer causing a machine-readable training data storage device to store a plurality of training data items for training the request paraphrasing model. Each of the plurality of training data items includes a first request including a word sequence and a second request including a word sequence as a paraphrase of the first request. The method further includes a training step of a computer training the request paraphrasing model, for each of the plurality of training data items stored in the training data storage device, using the first request as an input and the second request as teacher data.

Preferably, each of the plurality of training data items further includes a classification code indicating one of a predetermined plurality of request classes to which the first request belongs. The training step includes a step of the computer training the request paraphrasing model, for each of the plurality of training data items stored in the training data storage device, using the first request and the classification code as inputs and the second request as teacher data.

More preferably, the method further includes the steps of: inputting a training request to the request paraphrasing model trained at the training step and obtaining one or more paraphrased requests for the training request from the request paraphrasing model; inputting the paraphrased request to a question-answering system and obtaining an answer from the question-answering system; evaluating quality of the answers obtained from the question-answering system to the request, for each of said one or more paraphrased requests based on a comparison with the training request; and, for each of one or more answers evaluated to be of high quality at the evaluating step, generating a training data item including the training request as the first request and the paraphrased request when the answer is obtained from the question-answering system as the second request, and adding the generated item to the training data storage device to be stored.

According to a third aspect, the present invention provides a request determining model training method for determining whether or not an input natural language sentence is a potential request. The method includes the step of a computer storing, in a machine readable training data storage device, a plurality of training data items for training the request determining model. Each of the plurality of training data items includes an object sentence as an object of request determination and a label indicating whether or not the object sentence is a request. The method further includes the step of a computer training the request determining model using the plurality of training data items stored in the training data storage device. The training step includes the steps of a computer converting the object sentence of each of the plurality of training data items stored in the training data storage device to a word vector sequence, and the computer training the request determining model, for each of the plurality of training data items stored in the training data storage device, using the word vector sequence as an input and the label as teacher data.

According to a fourth aspect, the present invention provides a dialogue system, including a prescribed interactive request responding system and a separate responding system different from the interactive request responding system.

The dialogue system includes: a determining means for determining whether or not an input natural language sentence is a request; a request paraphrasing means for outputting a paraphrased request, by paraphrasing the natural language sentence determined to be a request by the determining means to a request having a higher probability of getting a right response from the interactive request responding system than the natural language sentence; a means for applying the paraphrased request output from the request paraphrasing means to the interactive request responding system, and thereby causing the interactive request responding system to respond to the request; and a means for applying the natural language sentence determined not to be a request by the determining means to the separate responding system, and thereby causing the separate responding system to respond to the natural language sentence.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 10 is a flowchart representing a control structure of a program realizing, in cooperation with a computer, and a process of adding training data of a request paraphrasing system.

DESCRIPTION OF EMBODIMENTS

Figure 1:
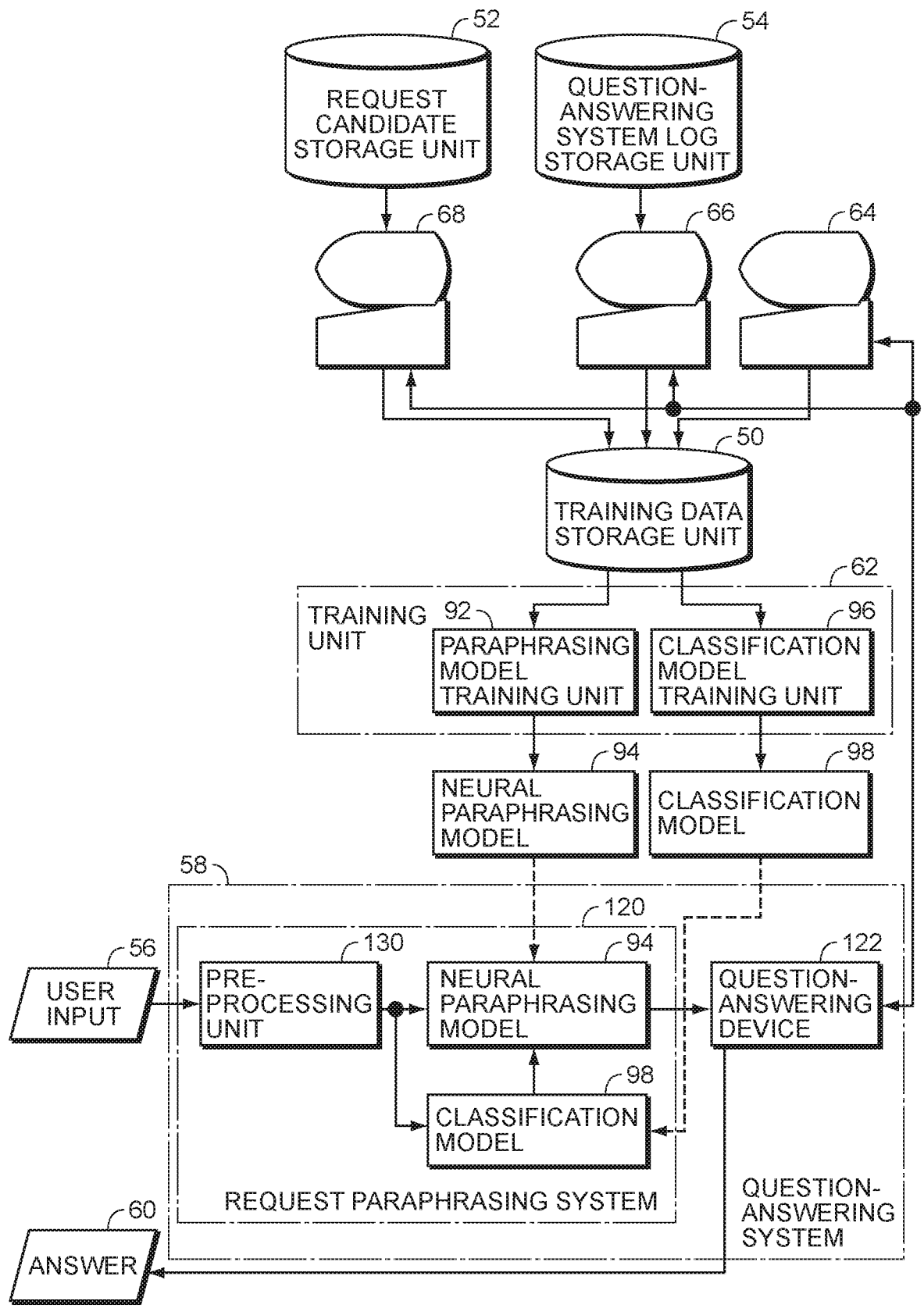
FIG. 1 is a block diagram showing a schematic configuration of the question-answering system in accordance with a first embodiment, as an example of the dialogue system in accordance with the present invention.

In the following description and in the drawings, the same reference characters represent the same or corresponding components. Therefore, detailed description thereof will not be repeated.

First Embodiment

<Configuration>

«Overall Configuration»

Referring to FIG. 1, the overall question-answering system in accordance with the first embodiment of the present invention includes: a question-answering system 58 receiving a user input 56 and outputting an answer 60 as a response; a training unit 62 training a neural paraphrasing model 94 comprised of a deep neural network used in the question-answering system 58 and training a classification model 98 for classifying requests; and a training data storage unit 50 storing training data used for training by training unit 62. Training data includes a plurality of training data items. Each training data item includes a combination of a first request, a second request having substantially the same meaning as the first request and having a higher probability of being answered by the question-answering system 58 than the first request, and a classification code indicating to which class the first request belongs.

When the training data items are manually prepared, in order to standardize the results of paraphrasing as much as possible, it is recommendable to manually classify the first requests to "factoid questions," "why questions" and the like and to designate, class by class, formats after paraphrasing. The classification code mentioned above indicates this classification. The classifications used in the present embodiment and the formats of the second requests after paraphrasing used in each class are as follows.

(1) what question
(2) what-if question
(3) definition question
(4) why question
(5) how question A "what question" is typically paraphrased to the format of "interrogative+particle" or "subject+interrogative." The interrogative may be "what," "who" and "where." By way of example, a question "I'm going to Miyazaki, and where do you recommend to visit?" will be paraphrased to "Where to go in Miyazaki?"

A "what if" question is paraphrased to the format of "what happens if" For example, "What if I should have an accident?" is paraphrased to "What happens if I have an accident."

A definition question is paraphrased to the format of "what is . . . ?" For example, "What is the meaning of qi-stagnation?" is paraphrased to "What is qi-stagnation?"

A why question is paraphrased to the format of "why does . . . " For example, "I wonder the reason why Japan suffers from deflation?" is paraphrased to "Why does Japan suffer from deflation?"

A how-to question is paraphrased to the format of "how . . . ?" For example, "Is there any measure to suppress the bitterness of bitter gourd?" is paraphrased to "How to suppress the bitterness of bitter gourd?"

By utilizing these classifications as features to be input to models, accuracy can be improved. At the time of manual paraphrasing, reference to operations of an existing question-answering device 122 would be helpful to determine what format of requests is suitable for question-answering device 122 to provide good responses, and by working in this manner, the quality of training data items can be improved.

«Training Data Storage Unit 50»

Training data stored in training data storage unit 50 includes a large number of training data items. Each training data item includes: a pre-paraphrase request in a natural language (request to be paraphrased); a request obtained by paraphrasing the pre-paraphrase request to a question sentence having a higher probability to get a right answer from question-answering device 122 than the pre-paraphrase request; and a classification code indicating a class to which the pre-paraphrase request belongs.

«Training Unit 62»

Training unit 62 includes: a paraphrasing model training unit 92 for training a neural paraphrasing model 94 through machine learning using the training data stored in training data storage unit 50; and a classification model training unit 96 for training a classification model 98 through machine learning such that a classification code, indicating one of the five classes to which an input request belongs, is output, using the first request and its classification code included in each training data item of the training data stored in training data storage unit 50.

«Question-Answering System 58»

Question-answering system 58 includes: the existing question-answering device 122; and a request paraphrasing system 120 configured to receive a user input 56 for paraphrasing the user input 56 to a request to which question-answering device 122 has higher probability of generating an answer than the user input 56. Inputs to question-answering device 122 include two types of sentences, that is, sentences requesting some information and sentences requesting some action. In the following description a "request" represents either of these.

Request paraphrasing system 120 includes: a pre-processing unit 130 for performing a morphological analysis of user input 56, converting each word to a word vector and thereby converting the user input 56 to a word vector sequence; a classification model 98 trained by training unit 62 for classifying, based on the word vector sequence output from a pre-processing unit 130, to which of the five classes the request represented by user input 56 belongs and for outputting a classification code; and the afore-mentioned neural paraphrasing model 94 trained by training unit 62 such that using the word vector sequence output from pre-processing unit 130 and the classification code output from classification model 98 as inputs, the user input 56 is paraphrased to a request having a higher probability of getting a right answer from question-answering device 122 than the user input 56. In the present embodiment, neural paraphrasing model 94 is a so-called sequence-to-sequence model and it has a configuration similar to that of a neural machine translation model using GRU (Gated Recurrent Unit), which is a type of RNN. The present embodiment uses so-called word embedded vectors of a fixed length as the word vectors. A so-called one hot vector may be used. Further, an LSTM (Long Short-Term Memory) may be used in place of GRU.

Referring to FIG. 1, in the present embodiment, a training data item is generated by (1) a first training data generating unit 64 for the manual generation of a pre-paraphrase sentence and a paraphrased request; (2) a second training data generating unit 66 for manual addition of a paraphrased request expressing substantially the same information as the question to a question to which question-answering device 122 could not give an answer, read from question-answering system log storage unit 54 storing requests to which question-answering system 122 was unable to give any answers; and (3) a third training data generating unit 68 for manual addition of a paraphrased request to a request candidate stored in a request candidate storage unit 52. The manual generation of training data should be carried out by inputting each paraphrased request candidate to question-answering device 122 and confirming whether or not an answer is obtained. The request candidates stored in request candidate storage unit 52 are prepared by extracting sentences from the web pages having "?" at the tail position and having an interrogative such as "what" or "why" or a pattern from which it can be known to be a request by pattern matching, and further selecting those satisfying a condition that the number of words therein exceeds a certain threshold. Further, for each of the training data items, one of the five classes mentioned above to which it belongs is determined manually and a classification code is added.

In paraphrasing, unnecessary portions may be deleted or a complex sentence may be replaced by a simple sentence, so that the paraphrased format becomes simpler and easier for the system to process. For instance, sentences such as "I have some eggs left at hand. and I wonder what can I do with them?" and "I have an '.ai' file", but I don't know what I should use to open this?" including a conditional expression or an anaphora cannot easily be processed appropriately by an existing system. If these are converted to simple sentences such as "What can I make from eggs?" and "With what can one open an .ai file?" it becomes possible for the question-answering system to provide answers. Therefore, in the process of paraphrasing, it is desirable that unnecessary expressions or colloquial or non-standard expressions are modified as much as possible and that formats after paraphrasing are standardized. Further, we avoid addition of a new content word or words.

Instead of simply answering "yes" or "no" to inputs such as "Is vaccination effective?" and "Is a smart speaker good?", these may be paraphrased to different questions such as "What if I fail to get a vaccination?" or "What if I use a smart speaker?" Such paraphrasing may lead to answers as information that the user potentially desires.

Neural Paraphrasing Model 94

Neural paraphrasing model 94 shown in FIG. 1 is, in the present embodiment, a system including a network formed by necessary numbers of copies of a common module, the module being an RNN, which is a type of neural network, or, more specifically, a GRU which is a type of RNN. At the end of each input sentence, an end-of-sentence sign <S> is added.

Figure 2:
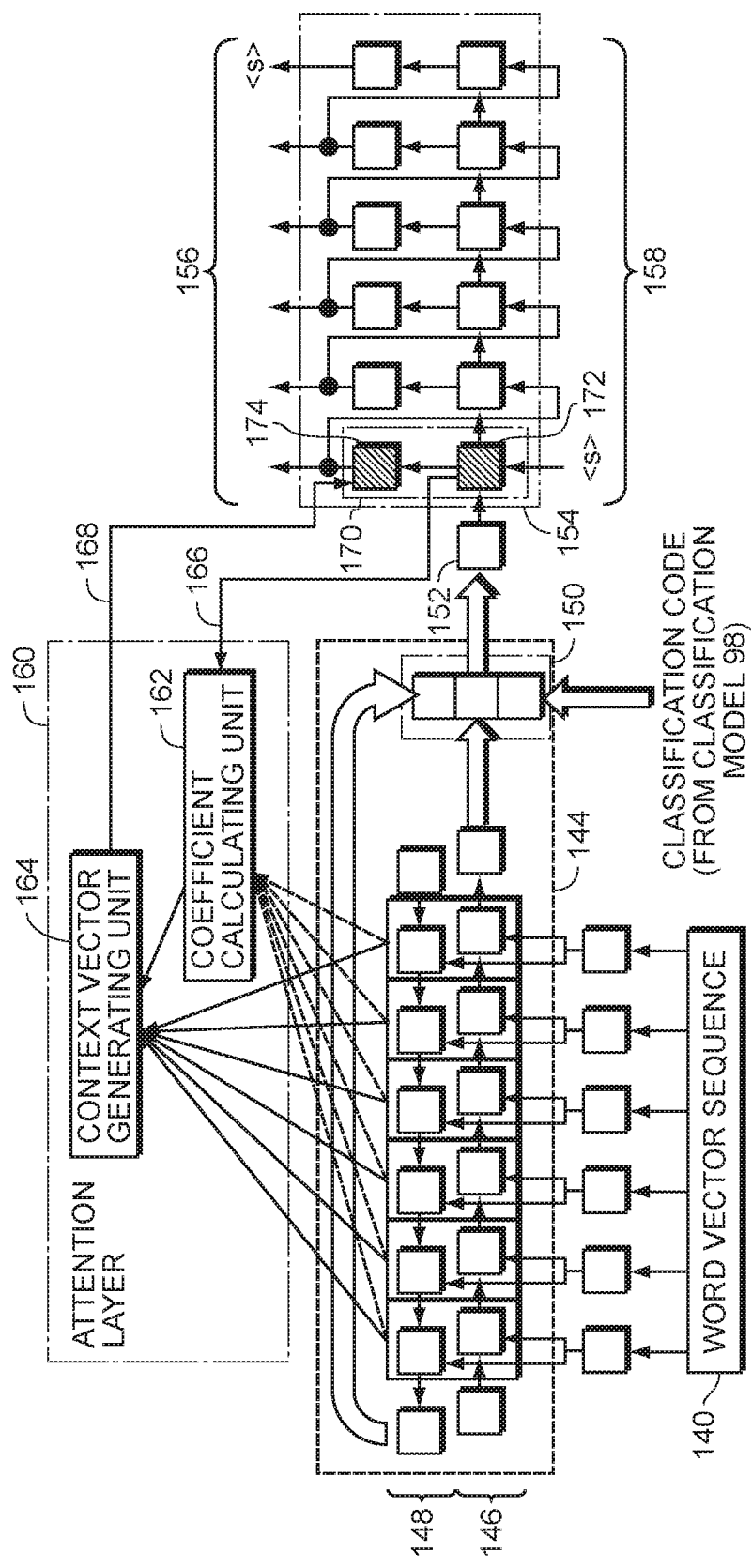
FIG. 2 is a schematic illustration showing a configuration and operation of a neural paraphrasing model shown in FIG. 1.

Referring to FIG. 2, neural paraphrasing model 94 includes: an encoder 144 configured to receive a word vector sequence 140 representing the first request, for outputting an intermediate node vector 152 representing the meaning of the first request; a decoder 154 configured to receive the intermediate node vector 152 output from encoder 144 as an input, for outputting a word sequence 156 of the paraphrased request; and an attention layer 160 for calculating a context vector used by the decoder 154 in calculating each word of word sequence 156, from values referred to as attention and hidden states of each GRU in encoder 144 and applying it to decoder 154.

Encoder 144 includes a forward GRU sequence 146 arranged to receive word vectors of word vector sequence 140 in order from the first one, and a backward GRU sequence 148 arranged to receive word vectors of word vector sequence 140 in order from the last one. GRUs in the forward GRU sequence 146 are connected in the forward direction such that each receives a word vector of word vector sequence 140 and a hidden state of an immediately preceding GRU. Backward GRU sequence 148 similarly includes a plurality of GRUs connected to receive word vectors of word vector sequence 140 in the backward direction. To the GRUs at the heads of forward GRU sequence 146 and backward GRU sequence 148, the hidden state of the GRU in the initial state is applied. The numbers of GRUs forming the forward and backward GRU sequences 146 and 148 are the same as the number of word vectors forming word vector sequence 140. Forward GRU sequence 146 is formed in response to an input of word vector sequence 140, by copying the same GRU by the number in accordance with the number of word vectors. Similarly, backward GRU sequence 148 is formed in response to an input of word vector sequence 140, by copying the same GRU by the number in accordance with the number of word vectors.

Encoder 144 further includes a combining unit 150 for combining and linearizing the output of the last GRU of the forward GRU sequence 146, the last output of backward GRU sequence 148, and a classification code from classification model 98, and outputting the result as intermediate node vector 152 to decoder 154.

Decoder 154 includes a plurality of pairs 170 as components. A pair 170 includes a GRU 172 and an integrating unit 174 for integrating an output of GRU 172 and an output of attention layer 160. Though a plurality of pairs are shown following the pair 170 in FIG. 2, this shows the time sequence of the inputs and the outputs of pair 170, and actually, one pair 170 is sufficient.

These pairs 170 are arranged such that the input of GRU 172 of pair 170 at the head position receives the end-of-sentence sign <s> of the first request, and at other positions, each GRU 172 receives a word vector converted from a word output from integrating unit 174 of the immediately preceding pair 170. The outputs of GRU 172 of pair 170 are connected to the input of integrating unit 174 of the same pair 170. Further, GRU 172 is connected to attention layer 160 so that the attention is calculated using the hidden state of GRU 172 of pair 170.

The input of integrating unit 174 is connected to receive the output of GRU 172. Further, integrating unit 174 is connected to receive a context vector 168 from attention layer 160. Integrating unit 174 calculates, using the hidden state calculated from the output of GRU 172 and the context vector 168 received from attention layer 160, probabilities of words to be output, and outputs a word having the highest probability. This word is converted to a word vector and also applied to the input of GRU 172 of the next pair.

Attention layer 160 includes: a coefficient calculating unit 162 for calculating, as the attention, a coefficient indicating a degree of importance of hidden state of each GRU in encoder 144 in the hidden state of GRU 172 in the processing of hidden states of decoder 154; and a context vector generating unit 164 for calculating a context vector 168 as a weighted average of hidden states of respective GRUs using the coefficient calculated for each GRU by coefficient calculating unit 162, and supplying it to integrating unit 174 of the pair 170.

In training neural paraphrasing model 94, for example, words of the first request to be subjected to paraphrasing of the training data are used as the input to corresponding GRUs of encoder 144, and intermediate node vector 152 is calculated further using the classification code of the first request. When the sign <s> indicating the end of the input sentence is given, the sign <S> is input to GRU 172 of pair 170 of decoder 154, and its output and the context vector 168 calculated by attention layer 160 are used in integrating unit 174 to predict the word at the start of the request after paraphrasing. Using the difference between the prediction and the teacher signal of the word at the start of the second request after paraphrasing of the training data, a parameter set is trained by error back propagation. Thereafter, the parameter set is trained using a word in the second request as an input to GRU 172 of pair 170, and the next word as well as a sign <S> indicating the end of the second request as teacher signals. This process is executed for each training data item.

The object of training neural paraphrasing model 94 is to learn the values of a set of parameters defining the paraphrasing function realized by the basic GRU.

Once the training is completed, words of the object of paraphrasing as the input sentence are successively input to neural paraphrasing model 94 followed by the sign <S>, which causes neural paraphrasing model 94 to output a word, which is the first word of the paraphrased request. Then, the word output from neural paraphrasing model 94 is input to neural paraphrasing model 94 as a next input and the word thus obtained from neural paraphrasing model 94 will be the next word of the request sentence. This process is repeated until the sign <S> is eventually obtained as the output of neural paraphrasing model 94, when the paraphrased request is determined.

The configuration of neural paraphrasing model 94 is not limited to that shown in FIG. 2 and other configuration may be used.

«Classification Model 98»

Figure 3:
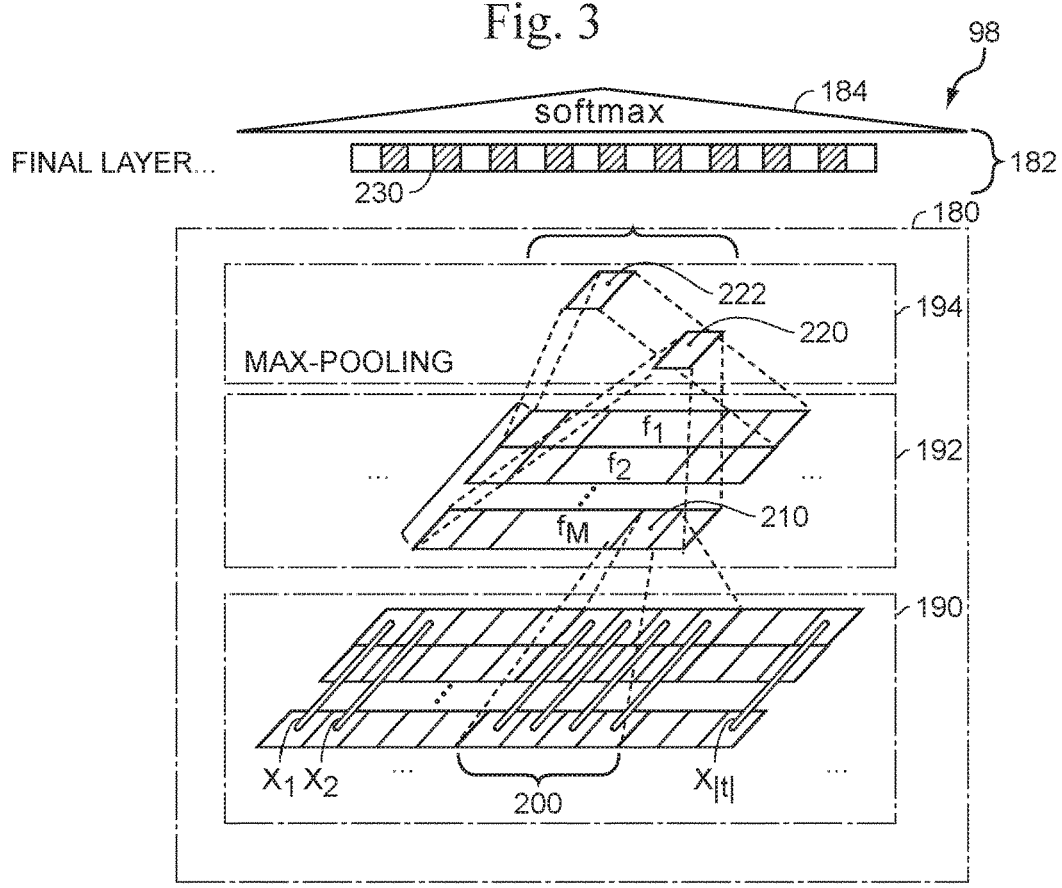
FIG. 3 schematically shows a configuration of a convolutional neural network implementing the classification model shown in FIG. 1.

FIG. 3 schematically shows a configuration of a convolutional neural network 180 implementing the classification model 98 shown in FIG. 1. Referring to FIG. 3, for the purpose of a clearer description, it is assumed that the convolutional neural network 180 of classification model 98 consists simply of an input layer 190, a convolutional layer 192 and a pooling layer 194, while the network may consist of a plurality of sets of these three layers.

To the input layer 190, word vector sequences $X_1$, $X_2$, ..., $X_{|t|}$, representing each word of the first request are input. The word vector sequences $X_1$, $X_2$, ..., $X_{|t|}$ are represented as a matrix $T=[X_1, X_2, ..., X_{|t|}]^T$. To the matrix T, M feature maps are applied. The feature map is a vector and a vector O, an element of each feature map, is computed by applying a filter represented by $f_j$ ($1 \leq j \leq M$) to an N-gram 200 comprised of consecutive N word vectors, while shifting N-gram 200. N is an arbitrary natural number, while N=3 in this embodiment. Specifically, O is given by the equation below.

$$O = f(W_{fj} \cdot x_{i:j:N-1} + b_{ij}) \quad (1)$$

where · represents elementwise multiplication followed by summation of the results, and f(x)=max (0, x) (normalized linear function). Further, if the number of elements of word vector is d, weight $W_{fj}$ is a real matrix of d×N dimensions, and bias $b_{ij}$ is a real number.

It is noted that N may be the same for the entire feature maps or N may be different for some feature maps. The relevant value of N may be something like 2, 3, 4 or 5. Any filter may be used for the convolutional neural network 180. A filter for image processing may be conveniently used.

For each feature map, the subsequent pooling layer 194 performs so-called max pooling. Specifically, pooling layer 194 selects, from elements of feature map $f_M$, for example, the maximum element 210 and takes it out as an element 220. By performing this process on each of the feature maps, elements 220, ... 222 are taken out, and these are concatenated in the order of $f_1$ to $f_M$ and output as a vector 230 to a final layer 182. The final layer 182 applies the vector 230 to Softmax layer 184. In the present embodiment, the number of outputs of classification model 98 are five that correspond to the five classes, and the respective probabilities are obtained at these outputs. Regarding pooling layer 194, one that performs max-pooling is said to have a higher accuracy than one that adopts average-pooling. It is possible, however, to adopt average-pooling, or other type of pooling techniques may be used if that well represents characteristics of the lower layer.

The training data item consists of a word vector sequence obtained from user input 56 mentioned above and a label indicating whether or not the user input 56 is a request. During training, to the input of classification model 98, word vector sequence as the object of classification is applied, the output of classification model 98 is compared with the label of its text, and the difference is calculated. Each of the weights and biases forming classification model 98 are adjusted to reduce the value of the error function by general back propagation.

Program Structure

Figure 4:
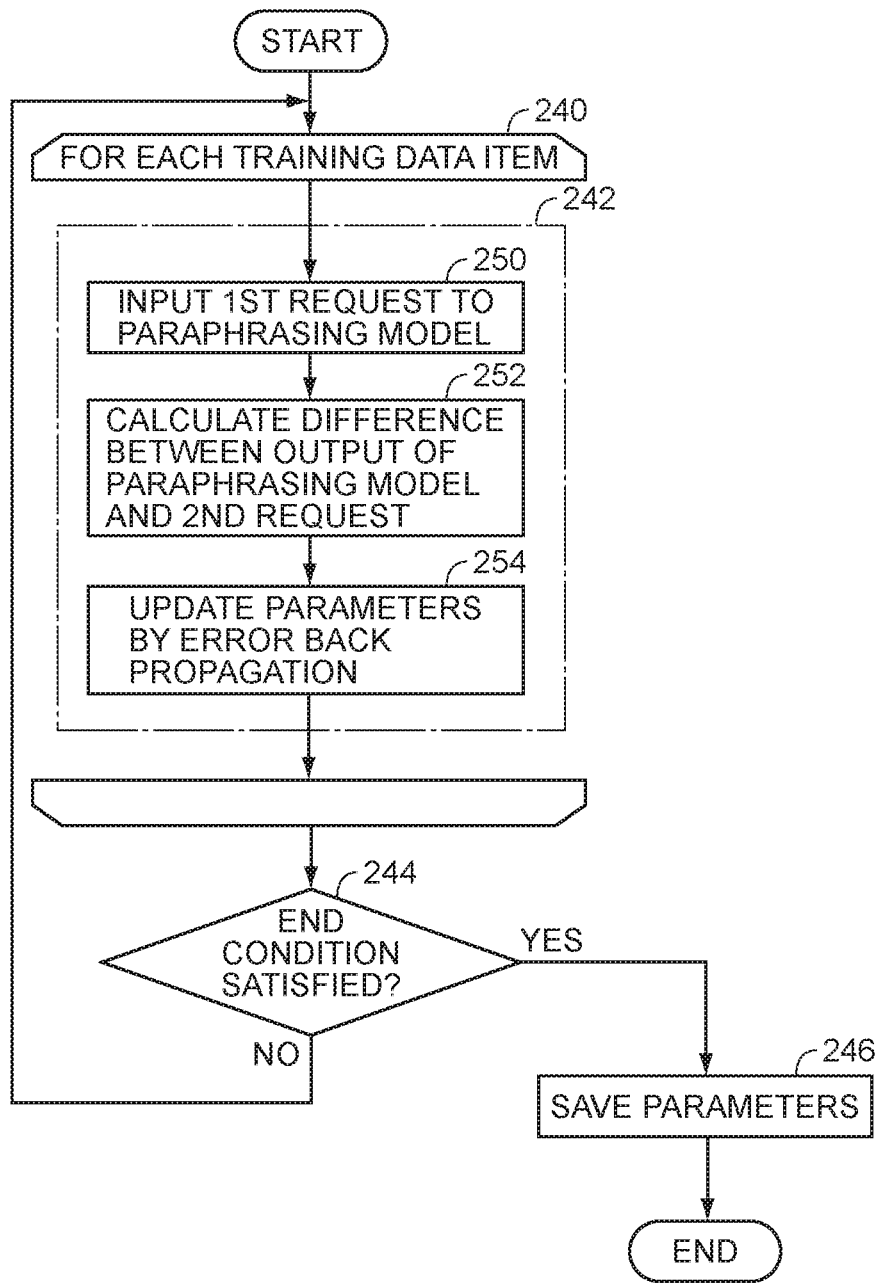
FIG. 4 is a flowchart representing a control structure of a program realizing the training by a training device of the neural network paraphrasing model shown in FIG. 1 in cooperation with a computer.

FIG. 4 is a flowchart representing a control structure of a program realizing the function of training unit 62 shown in FIG. 1 in cooperation with a computer. Referring to FIG. 4, the program includes: a step 240 of performing a training process 242 of training neural paraphrasing model 94 for each of the training data items stored in training data storage unit 50; a step 244, following step 240, of determining whether or not a prescribed end condition is satisfied, and branching the control flow depending on the result of determination; and a step 246, executed if the determination at step 244 is positive, of saving the parameters of neural paraphrasing model 94 in a prescribed storage device and ending the process. If the result of determination at step 244 is negative, the control returns to step 240 and the next training is executed.

Training process 242 includes: a step 250 of inputting the first request of a training data item as the object of processing and its classification code to neural paraphrasing model 94; a step 252 of calculating a difference between the output resulting from neural paraphrasing model 94 and the second request of the training data item as the object of processing; and a step 254 of updating parameters of neural paraphrasing model 94 by error back propagation based on the difference obtained at step 252.

The end condition at step 244 may be any of the following:

(1) The accuracy of paraphrasing by neural paraphrasing model 94 has attained a prescribed threshold;
(2) the difference between the accuracy of paraphrasing by neural paraphrasing model 94 and the accuracy of the last verification becomes equal to or smaller than a prescribed threshold;
(3) the number of repetition of the training and verification exceeded (or reached) a prescribed threshold number.

Of these, in the present embodiment, either the condition if the difference between the accuracy of paraphrasing by neural paraphrasing model 94 of verifying data and the accuracy at the time of the last training becomes equal to or smaller than a prescribed threshold (first threshold) or the condition if the number of repetition of the training and verification exceeded a prescribed number (second threshold) is satisfied, the process ends.

Figure 5:
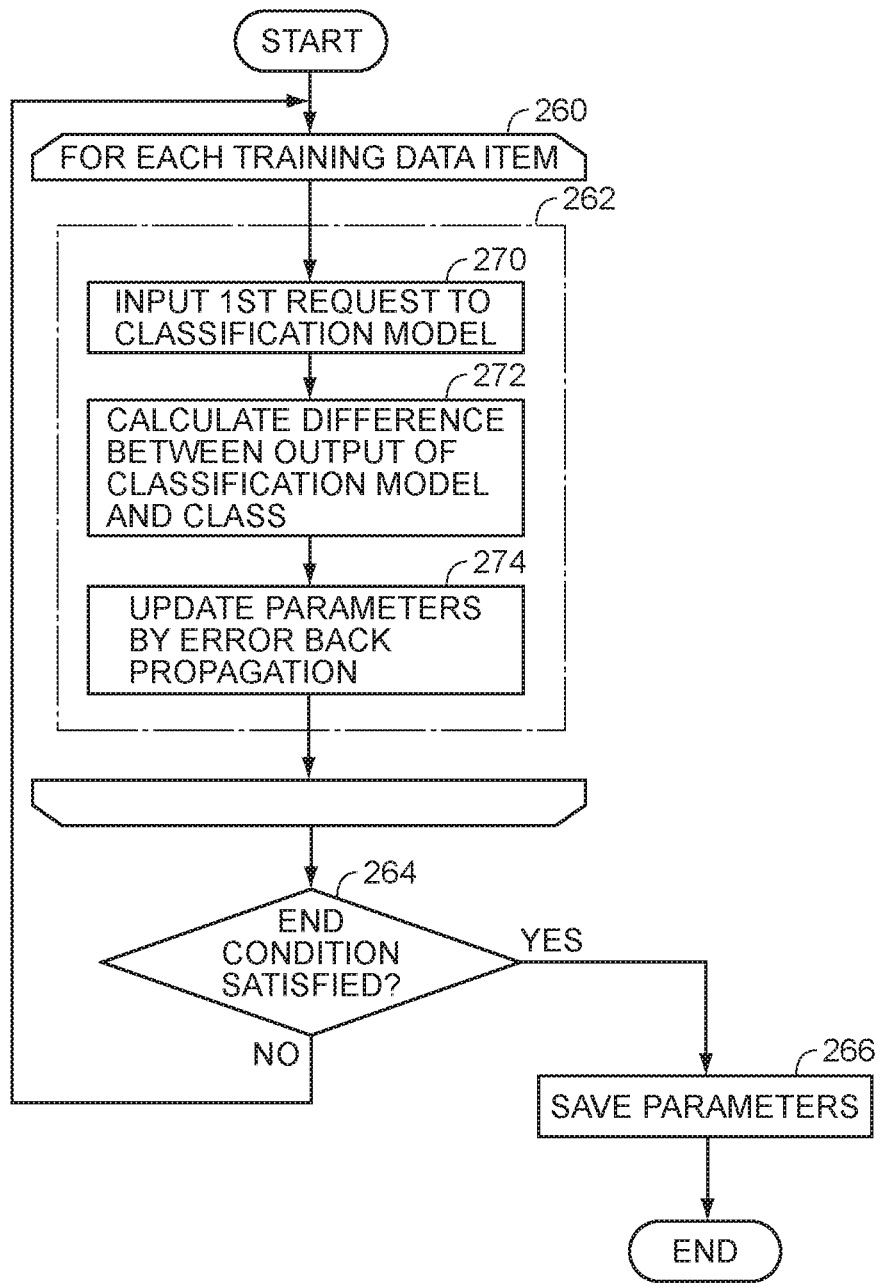
FIG. 5 is a flowchart representing a control structure of a program realizing a classification model training unit shown in FIG. 1 in cooperation with a computer.

FIG. 5 is a flowchart representing a control structure of a program realizing classification model training unit 96 shown in FIG. 1 in cooperation with a computer. Referring to FIG. 5, the program includes: a step 260 of executing a training process 262 of training classification model 98 for each training data item stored in training data storage unit 50; a step 264 of determining whether or not an end condition of training classification model 98 is satisfied and branching the control flow; and a step 266, executed if the determination at step 264 is positive, of saving the parameters of classification model 98 in a prescribed storage device and ending the execution of this program. If the determination at step 264 is negative, the control returns to step 260 and the next training cycle is executed. As to the determination at step 264, in the present embodiment, the classification accuracy by classification model 98 is measured by using a verification data separately prepared beforehand, and if a difference between the measurement and the value at the time of the last training becomes equal to or smaller than a prescribed threshold (third threshold), or if the number of repetition of training exceeds a prescribed number (fourth threshold), it is determined that the end condition is satisfied.

Training process 262 includes: a step 270 of inputting the first request of the training data item as the object of processing to classification model 98; a step 272 of calculating a difference between a classification code output from classification model 98 and a classification code in the training data item as the object of processing; and a step 274 of updating parameters of classification model 98 by error backward propagation based on the difference calculated at step 272.

Figure 6:
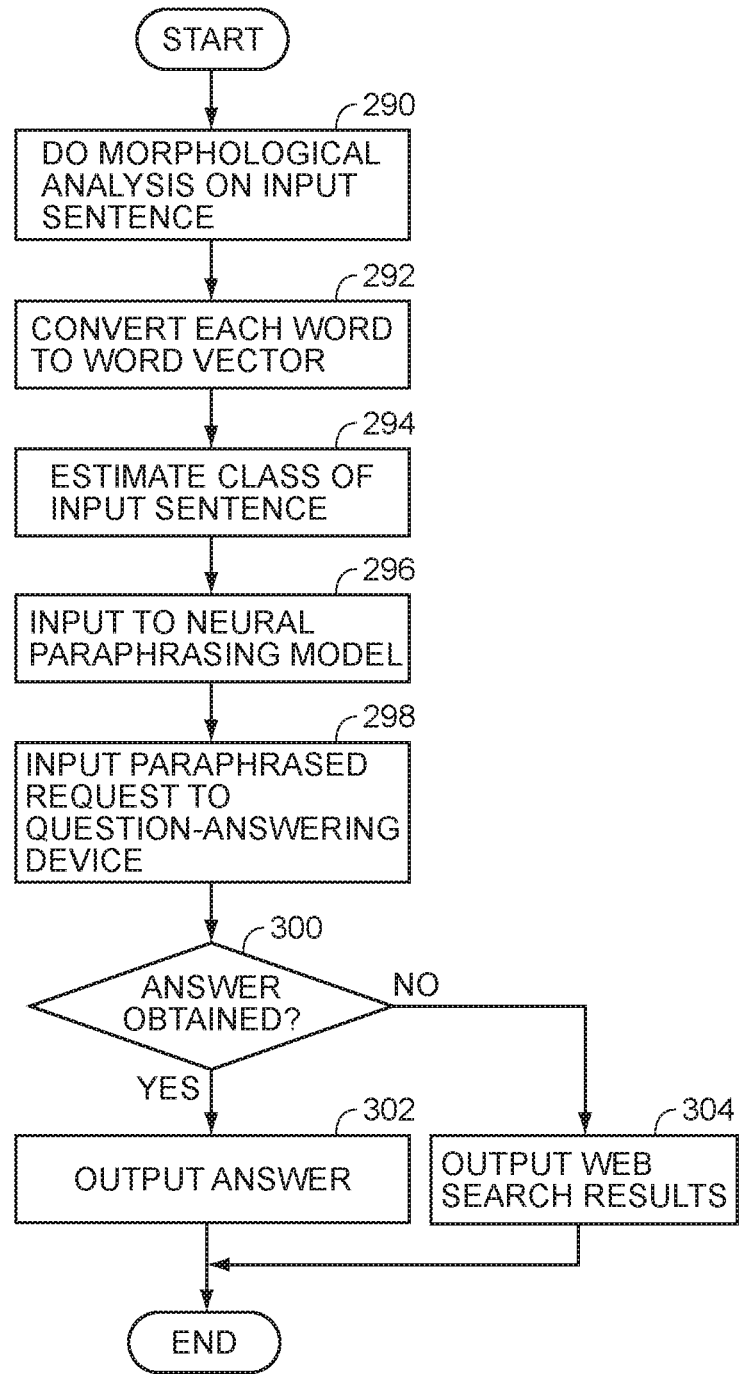
FIG. 6 is a flowchart representing a control structure of a program realizing the question-answering system shown in FIG. 1 in cooperation with a computer.

FIG. 6 is a flowchart representing a control structure of a program causing a computer to function as the question-answering system 58 shown in FIG. 1 in cooperation with a computer. Referring to FIG. 6, the program includes: a step 290 of doing a morphological analysis on a natural language input sentence input by user input 56 and converting it to a morpheme sequence; a step 292 of converting words obtained by the morphological analysis at step 290 to word vectors and thereby converting the input sentence to a word vector sequence; a step 294 of applying the word vector sequence obtained by the process of step 292 to classification model 98 and thereby estimating a classification code of the request represented by user input 56; a step 296 of inputting the word vector sequence obtained by the process of step 292 and the classification code estimated at step 294 to neural paraphrasing model 94 to be converted to a word sequence of a request to be output from neural paraphrasing model 94; and a step 298 of inputting the paraphrased request obtained by the process at step 296 to question-answering device 122.

The program further includes: a step 300 of determining whether or not an answer is given from question-answering device 122 as a result of step 298, and branching the control flow depending on the result of determination; a step 302, executed if the determination at step 300 is positive, of outputting the answer of question-answering device 122 as an answer 60 (see FIG. 1) to the outside of question-answering system 58 and ending the execution of the program; and a step 304, executed if the determination at step 300 is negative, of generating a list of web sites as web search results using the input sentence or the paraphrased request by a search engine, not shown, outputting the list as an answer 60 and ending the execution of the program.

Operation

The training unit 62 and question-answering system 58 in accordance with the first embodiment of the present invention operate as follows.

First, training data items are generated and stored in training data storage unit 50. Training data items are generated as follows. (1) Pairs of pre-paraphrasing requests and paraphrased requests are prepared manually to be used as training data items. (2) From logs of question-answering device 122, any request to which no answer could be found by question-answering device 122 is collected. A paraphrased request expressing substantially the same information as such request and to which an answer can be obtained from the question-answering device 122 is manually prepared. This paraphrased request and the pre-paraphrasing request are paired to be a training data item. (3) A request candidate is extracted from the web, and stored in request candidate storage unit 52. For the stored request candidate, a paraphrased request to which an answer can be given by question-answering device 122 is manually prepared. The stored request candidate and the paraphrased request are paired as first and second requests, respectively, to be used as a training data item. To each training data item prepared by any of the procedures above, one of the afore-mentioned five classes is manually determined and a corresponding classification code is added.

Referring to FIG. 1, training unit 62 trains neural paraphrasing model 94 using the training data items stored in training data storage unit 50.

In the present embodiment, once the training of neural paraphrasing model 94 by paraphrasing model training unit 92 ends (step 240 of FIG. 4), the accuracy of neural paraphrasing model 94 is calculated using separately prepared verification data. If the difference between this accuracy and the accuracy of the last training becomes equal to or smaller than the first threshold, or if the number of training by training unit 62 exceeds the second threshold, the training of neural paraphrasing model 94 ends (YES at step 244 of FIG. 4), a group of parameters defining the function by neural paraphrasing model 94 is stored in the storage device, and the process ends (step 246). If the difference of accuracy is larger than the threshold and the number of trainings by training unit 62 is equal to or smaller than the second threshold (NO at step 244), the training of neural paraphrasing model 94 is again executed by training unit 62 (path from step 244 to step 240).

The above-described process is executed until the end condition is satisfied at step 244 and thereby the training of neural paraphrasing model 94 is completed. The trained neural paraphrasing model 94 consists of the program realizing the configuration shown in FIG. 2 and the parameters of the GRUs forming encoder 144 and decoder 154.

Classification model 98 shown in FIG. 1 is also trained in a similar manner. Specifically, when the training of classification model 98 by classification model training unit 96 once ends (step 260 of FIG. 5), the accuracy of classification by classification model 98 is calculated using separately prepared verification data. If the difference between this accuracy and the accuracy of the last training is equal to or smaller than the third threshold or if the number of trainings by classification model training unit 96 exceeds the fourth threshold, training of classification model 98 ends (YES at step 264 of FIG. 5), a parameter group defining the function of classification model 98 is stored in the storage device, and the process ends (step 266). If the difference of accuracy is larger than the threshold and the number of trainings by training unit 62 is equal to or smaller than the second threshold (NO at step 264), training of classification model 98 is again executed by training unit 62 (path from step 264 to step 260).

The above-described process is executed until the end condition is satisfied at step 264, and training of classification model 98 is completed. The trained classification model 98 consists of the program realizing the configuration shown in FIG. 3 and parameters defining the function represented by convolutional neural network 180.

In a running (test) phase after the end of training, question-answering system 58 shown in FIG. 1 operates as follows. Neural paraphrasing model 94 of request paraphrasing system 120 included in question-answering system 58 is the one trained by paraphrasing model training unit 92. Similarly, classification model 98 included in request paraphrasing system 120 is the one trained by classification model training unit 96.

Referring to FIG. 1, when a user input 56 is given, pre-processing unit 130 does a morphological analysis on user input 56 and converts it to a morpheme sequence (step 290 of FIG. 6). Further, pre-processing unit 130 converts the morpheme sequence to a word vector sequence (step 292), and using classification model 98, estimates the classification code of user input 56 (step 294). Further, the word vector sequence obtained at step 292 and the classification code obtained at step 294 are input to neural paraphrasing model 94 (step 296). At the end of word vector sequence, end-of-sentence sign <s> is added.

Referring to FIG. 2, each word forming this word vector sequence 140 is applied to encoder 144 of neural paraphrasing model 94. By forward GRU sequence 146 and backward GRU sequence 148, encoder 144 calculates respective final hidden states, which are combined with the classification code by combining unit 150 and linearized to be an intermediate node vector 152 and input to decoder input 158.

When the end-of-sentence sign <s> is applied to GRU 172 of pair 170 at the decoder input 158, GRU 172 changes the hidden state in accordance with the intermediate node vector 152 and the end-of-sentence sign <s>, generates an output vector and applies it to integrating unit 174 of the same pair 170. Further, the hidden state of GRU 172 is also applied as a hidden state vector 166 to coefficient calculating unit 162 of attention layer 160.

Coefficient calculating unit 162 calculates, as an attention, a coefficient indicating degree of importance of the hidden state of each of the GRUs in encoder 144, in the hidden state of GRU 172 as the object of processing of decoder 154. Using the coefficients calculated for respective GRUs by coefficient calculating unit 162, context vector generating unit 164 calculates weighted mean of hidden states of the GRUs to provide context vector 168, which is fed to integrating unit 174 of the pair 170.

Using the hidden state calculated by the output of GRU 172 and the context vector 168 received from attention layer 160, integrating unit 174 calculates probabilities of words to be output, and outputs the word having the highest probability. This word is converted to a word vector and also fed to the input of GRU 172 of the next pair.

Thereafter, the same process for the end-of-sentence sign <s> is repeated by the next pair on the output of integrating unit 174 of the pair 170 of a preceding step, and thus words of word sequence 156 will be output successively from decoder 154. As a result of such a process, at the time point when the end-of-sentence sign <s> is output from decoder 154, the word sequence 156 of the paraphrased request is determined, and the output of request paraphrasing system 120 is obtained. The output is the paraphrased request, namely, the request in an natural language as user input 56 paraphrased to have substantially the same meaning but a higher probability of obtaining an answer from question-answering device 122. The paraphrased request is input to question-answering device 122 (step 298 of FIG. 6). Question-answering device 122 generates an answer to the paraphrased request and outputs it as an answer 60 (step 302). The request output from neural paraphrasing model 94 is the one paraphrased to have a higher probability of getting an answer from question-answering device 122 and, therefore, the probability of obtaining a right output as an answer to user input 56 from question-answering device 122 is higher than when the request is not paraphrased. If an answer is still not obtained, however, a search engine, not shown, is used to perform a web search using the paraphrased request as key words, and the search results are generated and output (step 304).

Effects of the First Embodiment

As described above, according to the first embodiment, a request input by the user is paraphrased, using neural paraphrasing model 94, to a request having a higher probability of getting an answer from question-answering device 122, and input to question-answering device 122. Therefore, even when a user input includes a complex sentence, a colloquial expression or unnecessary information, the probability that question-answering device 122 outputs a right answer becomes higher. Further, by well adjusting the training data for neural paraphrasing model 94, it becomes more likely that question-answering device 122 provides an answer including such information that the user potentially desires, though not necessarily in a conscious way.

The pre-paraphrasing request is classified by classification model 98 and used as a feature input to neural paraphrasing model 94. Therefore, it is possible to paraphrase the user input 56 to a request in a right format in accordance with the type of the request and having a higher probability of getting an answer from question-answering device 122. The probability of obtaining a right answer to user input 56 in accordance with the type of the question from question-answering device 122 becomes higher. Needless to say, such a classification is not necessarily used as a feature.

Second Embodiment

<Configuration>
«Overall Configuration»

The first embodiment described above relates to a question-answering system. Therefore, there is no problem to process assuming that the input sentence is a request. In a more general dialogue system, however, an input may or may not be a request. It is generally unpredictable what type of input will be received. In such a situation, unconditional paraphrasing using neural paraphrasing model 94 as in the first embodiment may not be reasonable. It is necessary to apply the neural paraphrasing model only when it is a request. In the second embodiment, this is determined by a determination model, which is implemented by a convolutional neural network, an example of deep neural network, as is the case of classification model 98 used in the first embodiment, and only if the determination is positive (the input is some request), the input sentence is paraphrased by using the neural paraphrasing model and applied to the question-answering system.

Figure 7:
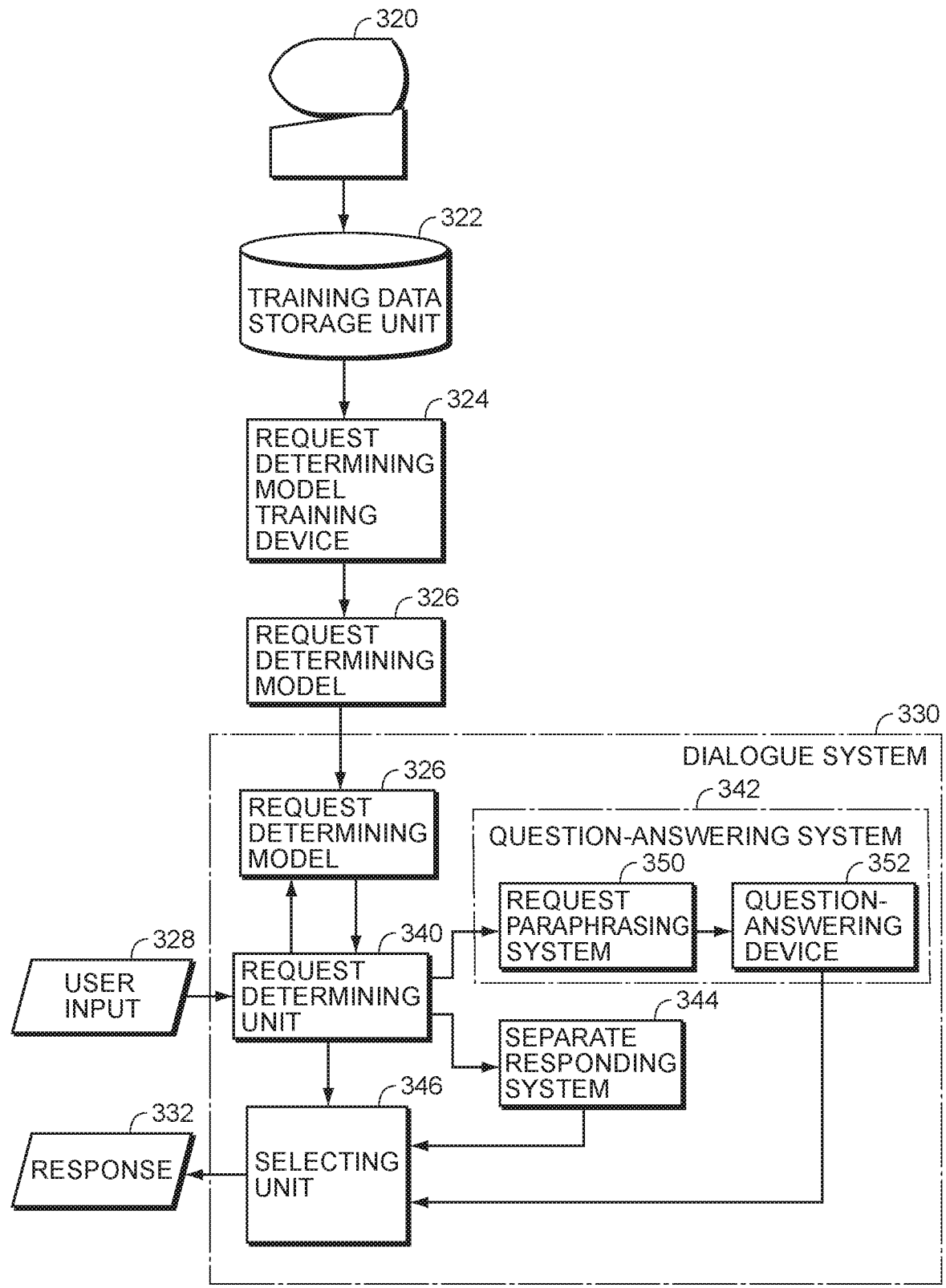
FIG. 7 is a block diagram schematically showing an overall configuration of the dialogue system in accordance with a second embodiment of the present invention.

Referring to FIG. 7, this system includes: a training data adding device 320 used by an operator for manually creating and adding training data items of a request determining model 326; a training data storage unit 322 for storing training data items created by using training data adding device 320; a request determining model training device 324 for training a request determining model 326 using the training data comprised of the training data items stored in training data storage unit 322; and a dialogue system 330 outputting a right response as a response 332 when a user input 328 is a request and when not, using the request determining model 326 trained by request determining model training device 324. When the training data items are formed, sentences having request-like patterns may be extracted from web sites on the Internet and whether or not these sentences are truly requests may be manually determined.

«Request Determining Model 326»

Request determining model 326 has a configuration similar to that of classification model 98 shown in FIG. 3. It is noted that request determining model 326 and classification model 98 are different in that request determining model 326 provides two outputs indicating a probability of being a request and a probability of not being a request, respectively. Though request determining model 326 and classification model 98 have different number of layers, different number of feature maps and different arrangements thereof, basically, their configurations are the same. Further, the method of training is also the same except that different training data are used. Therefore, detailed description thereof will not be repeated here.

The training data item used for training request determining model 326 consists of a pre-paraphrasing first request, and a label indicating whether or not the first request is a request. At the time of training, a word vector sequence as an object of request determination is given to an input of request determining model 326, an output of request determining model 326 (probabilities of it being a request and not being a request) is compared with the label of the text (if it is a request, (1, 0), if not, (0, 1)), and a difference is calculated. By common error back propagation, various weights and bias values forming request determining model 326 are adjusted to make the error function value smaller.

«Dialogue System 330»

Referring to FIG. 7, dialogue system 330 includes: request determining model 326 trained by request determining model training device 324; a request determining unit 340 configured to receive a user input 328 for determining whether or not user input 328 is a request or not using request determining model 326 and branching the user input 328 to either one of two outputs depending on the result of determination; a question-answering system 342 configured to receive, when the determination by request determining model 326 indicates a request, a word vector sequence from request determining unit 340 and providing an answer to a question represented by the word vector sequence; a separate responding system 344 different from the question-answering system, configured to receive the word vector sequence from request determining unit 340 and to provide an appropriate response, when the user input 328 is determined by request determining model 326 not to be a request; and a selecting unit 346 for selecting either the answer output from question-answering system 342 or the response output from separate responding system 344, which is right in accordance with the result of determination by request determining unit 340, as a response 332.

«Request Determining Unit 340»

Request determining unit 340 does, as pre-processing, a morphological analysis on user input 328 and converts each word to a word vector, so that a word vector sequence is generated. Request determining unit 340 applies the word vector sequence to request determining model 326 and obtains an output of request determining model 326. If the output of request determining model 326 is true (user input 328 is a request), request determining unit 340 applies the word vector sequence to question-answering system 342. Otherwise, request determining unit 340 applies the word vector sequence to the separate responding system 344.

«Question-Answering System 342»

Question-answering system 342 includes: a request paraphrasing system 350 having a configuration similar to that of request paraphrasing system 120 in accordance with the first embodiment; and a question-answering device 352 configured to output, as a response, an answer to a request paraphrased by request paraphrasing system 350, to selecting unit 346.

«Request Determining Model Training Device 324»

Referring to FIG. 7, request determining model training device 324 is for training request determining model 326 using the training data stored in training data storage unit 322. Each of the training data items stored in training data storage unit 322 includes a pair of a natural language sentence and a label indicating whether or not the sentence is a request. The training data items are mainly prepared manually. In the present embodiment, this function is realized by the cooperation of the computer hardware and a computer program. The structure of this computer program is the same as those shown in FIGS. 4 and 5.

«Program Structure»

Figure 8:
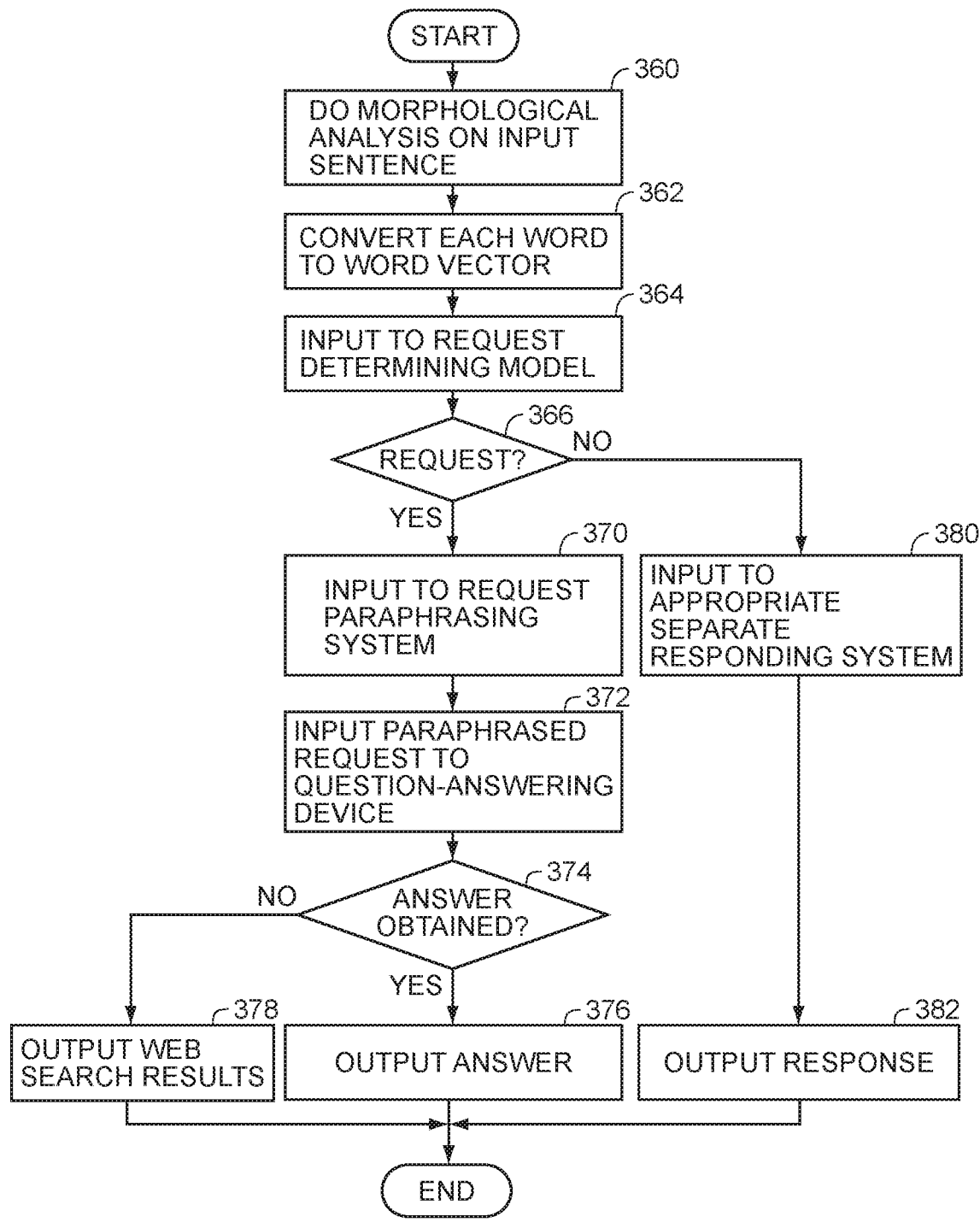
FIG. 8 is a flowchart representing a control structure of a program realizing the question-answering system shown in FIG. 7 in cooperation with a computer.

FIG. 8 shows a control structure of a program causing a computer to function as dialogue system 330 shown in FIG. 7. Referring to FIG. 8, the program includes: a step 360 of doing a morphological analysis on user input 328 to convert it to a morpheme sequence; a step 362 of converting each word of the morpheme sequence obtained at step 360 to a word vector and thereby outputting a word vector sequence; a step 364 of applying the word vector sequence obtained at step 362 to request determining model 326 to obtain an output of request determining model 326; and a step 366 of determining, based on the output of request determining model 326 at step 364, whether or not the user input 328 is a request and branching the control flow depending on the result of determination.

The program further includes: a step 370, executed when the determination at step 366 is positive, of inputting the word vector sequence obtained at step 362 to request paraphrasing system 350; a step 372 of inputting the word vector sequence output from request paraphrasing system 350 as a result of the process at step 370, to question-answering device 352; and a step 374, responsive to the process of step 372, of determining whether or not an answer is provided from question-answering device 352 and branching the control flow depending on the result of determination.

The program further includes: a step 376, executed when the determination at step 374 is positive, of selecting the answer of question-answering device 352, outputting it as a response 332 and ending execution of the program; a step 378, executed when the determination at step 374 is negative, of searching the web using the user input 328 as an input, outputting the search results and ending execution of the program; a step 380, executed when the determination at step 366 is negative, of giving the word vector sequence as an input not to the question-answering system 342 but to the separate responding system 344; and a step 382 of selecting and outputting the response output from separate responding system 344 as a result of step 380, and ending execution of this program.

<Operation>

Assuming that the training of the request paraphrasing system 350 has been already completed, the second embodiment has two operation phases. The first is a training phase of training request determining model 326 by request determining model training device 324, and the second is an interactive response phase of dialogue system 330 using the trained request determining model 326.

«Training Phase»

Referring to FIG. 7, in the training phase, request determining model training device 324 operates as follows. In training data storage unit 322, the training data prepared manually in advance is stored. Request determining model 326 is prepared in a prescribed initial state. Specifically, a program for realizing the convolutional network is loaded to the memory, an area for storing parameters defining the function represented by the convolutional network is secured in the memory and initialized, respectively.

Request determining model training device 324 trains request determining model 326 using the training data stored in training data storage unit 322 (corresponding to step 260 of FIG. 5). The scheme of training thereafter is the same as the training of classification model 98 shown in FIG. 5. Therefore, detailed description thereof will not be repeated here.

«Interactive Response Phase»

In the interactive response phase, dialogue system 330 operates as follows. Referring to FIG. 7, request determining unit 340 of dialogue system 330 receives a user input 328 and converts it to a word vector sequence (steps 360 and 362 of FIG. 8). Request determining unit 340 inputs this word vector to request determining model 326 for the purpose of request determination, and determines whether or not the user input 328 is a request (steps 364 and 366). Request determining unit 340 sorts the user input 328 to either one of two outputs. Specifically, if the determination by request determining model 326 is positive (YES at step 366), request determining unit 340 applies the word vector sequence to question-answering system 342 (step 370). Request paraphrasing system 350 of question-answering system 342 paraphrases the word vector sequence applied from request determining unit 340 to a request having a higher probability of getting an answer from question-answering device 352, and inputs the paraphrased request to question-answering device 352 (step 372). Question-answering device 352 tries to generate an answer to the request. If there is an answer (YES at step 374), question-answering device 352 generates the answer and outputs it to selecting unit 346 (step 376). If there is no answer, question-answering device 352 performs a web search using the paraphrased request as keywords on a web search engine and outputs the search results (step 378).

By contrast, if the determination by request determining unit 340 is negative (NO at step 366), request determining unit 340 applies the word vector sequence to separate responding system 344 (step 380). Separate responding system 344 generates a response to the word vector sequence and outputs it to selecting unit 346 (step 382).

If the determination by request determining unit 340 is positive, selecting unit 346 selects the output of question-answering device 352, and otherwise the output of separate responding system 344, as response 332.

Effects of the Second Embodiment

According to the second embodiment, not only in the question-answering system but also in the general dialogue system, requests and non-requests are sorted, and only those appropriate as requests to a question-answering system are provided as inputs to the question-answering system. Therefore, an answer appropriate for a dialogue can be generated. Further, as in the first embodiment, as a pre-stage to an input to the question-answering system, a request is paraphrased to have a higher probability of obtaining an answer from the question-answering system than before paraphrasing. As a result, for a request included in a dialogue, as in the first embodiment, even if the user input includes a complex sentence or unnecessary information, the probability that an appropriate answer is output from the dialogue system can be improved. Further, by adjusting the training data for the neural paraphrasing model, it becomes more likely that the question-answering system provides such information that the user potentially desires, though not necessarily in a conscious way.

Third Embodiment

<Configuration>

In the first embodiment, the training data items to be stored in training data storage unit 50 are generated by (1) first training data generating unit 64 manually generating a pre-paraphrase sentence and a paraphrased request; (2) second training data generating unit 66 manually adding, to a question to which question-answering device 122 could not give an answer, read from question answering system log storage unit 54 storing requests to which question-answering system 122 was unable to give any answer, a paraphrased request expressing substantially the same information as the request; and (3) third training data generating unit 68 manually adding a paraphrased request to a request candidate stored in a request candidate storage unit 52. Using the training data prepared in this manner, neural paraphrasing model 94 is trained without changing or adding the training data themselves. The present invention, however, is not limited to such embodiments. Neural paraphrasing model 94 may be trained while adding training data to the above, as follows.

Figure 9:
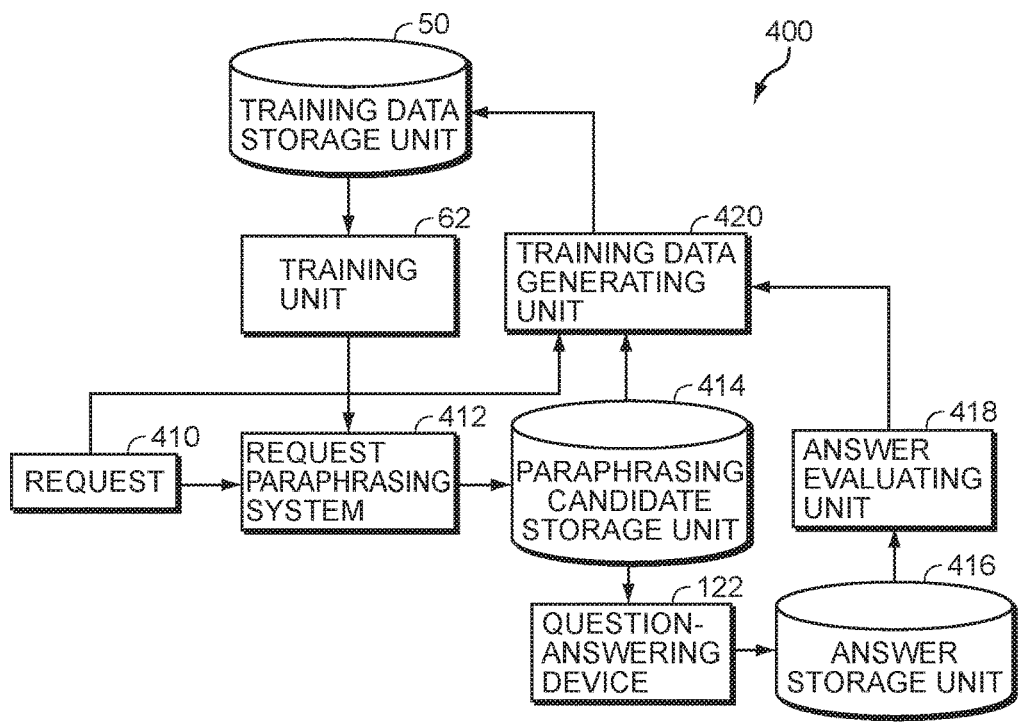
FIG. 9 is a block diagram showing a configuration of a request paraphrasing model training system in accordance with a third embodiment of the present invention.

FIG. 9 is a block diagram showing a request paraphrasing model training system 400 in accordance with a third embodiment. Referring to FIG. 9, request paraphrasing model training system 400 includes a training data storage unit 50, and a training unit 62 for training a request paraphrasing system 412 using training data storage unit 50. In the present embodiment, request paraphrasing system 412 has a function of outputting not only one paraphrased request but N best paraphrased request candidates. The N bests can be generated by combining, for each word forming word sequence 156 shown in FIG. 2, not only the candidates having the highest scores (probabilities) but also word candidates having the second or third highest scores.

Request paraphrasing model training system 400 further includes: a paraphrasing candidate storage unit 414 for storing as paraphrasing candidates N-bests obtained by inputting a request 410 to request paraphrasing system 412; question-answering device 122, which is the same as that described in the first embodiment, configured to receive each of the paraphrasing candidates stored in paraphrasing candidate storage unit 414 and to generate and output answers; an answer storage unit 416 for storing answers output from question-answering device 122; an answer evaluating unit 418 configured to evaluate each of the answers stored in answer storage unit 416 by some means (for example, manually) and to calculate a score; and a training data generating unit 420 configured to combine an answer that obtained a score equal to or higher than a prescribed threshold at answer evaluating unit 418 with request 410, to generate a training data item having the answer as the second request and request 410 as the first request, and to add it to training data storage unit 50 to be stored.

«Program Structure»

FIG. 10 shows a control structure of a computer program realizing, in cooperation with a computer, the process of adding the training data in request paraphrasing model training system 400 shown in FIG. 9. FIG. 10 shows a control flow for adding training data by using request paraphrasing system 412 of which training has been once completed.

Referring to FIG. 10, the program includes: a step 456 of giving one or more requests (request 410 shown in FIG. 9) to request paraphrasing system 412; a step 458 of obtaining N bests of paraphrased requests as outputs of request paraphrasing system 412 to each of request 410 and storing them in paraphrasing candidate storage unit 414; and a step 460 of applying each of N bests obtained for each of request 410 at step 458 to question-answering device 122, obtaining an output from question-answering device 122 to each request (answer to the request) and saving them in answer storage unit 416.

The program further includes: a step 462 of evaluating, for example manually, quality of each answer stored in answer storage unit 416 as an answer to request 410; and a step 464 of repeating the following process 466 for each answer determined to have the quality equal to or higher than a certain threshold at step 462, and ending execution of this program.

The process 466 includes: a step 480 of generating a new training data item by combining a request as a source of the answer (request 410 of FIG. 9) as the first request, an output of request paraphrasing system 412 for the request as the second request and a classification code determined by request paraphrasing system 412 for the first request; and a step 482 of adding the training data item generated at step 480 to the training data in training data storage unit 50.

<Operation>

The request paraphrasing model training system 400 in accordance with the third embodiment operates as follows.

Initial training data is manually prepared and stored in training data storage unit 50. Using the training data, training unit 62 trains request paraphrasing system 412. By some means, for example manually, one or more requests 410 are prepared and each of them is input to request paraphrasing system 412 (step 456 of FIG. 10). From request paraphrasing system 412, N bests of paraphrasing candidates to each request are output and saved in paraphrasing candidate storage unit 414 (step 458).

Each of the N best request paraphrasing candidates is input to question-answering device 122 (step 460). As a result, answers are obtained from question-answering device 122 and saved in answer storage unit 416. Using answer evaluating unit 418, the quality of the answer is evaluated manually for each combination of an answer and the request 410 as its source (step 462). For each of the answers evaluated to be of a high quality, a new training data item is generated by combining, as one set, the source request 410 as the first request, the paraphrased request output from request paraphrasing system 412 for request 410 as the second request and the classification code based on the result of classification done in request paraphrasing system 412 for the first request (steps 480). This training data item is added to the training data stored in training data storage unit 50 (step 482).

By executing such a process, the new training data items are added to training data storage unit 50. By training request paraphrasing system 412 using the training data with added data items, the accuracy of paraphrasing by request paraphrasing system 412 is expected to be higher.

[Computer Implementation]

Figure 11:
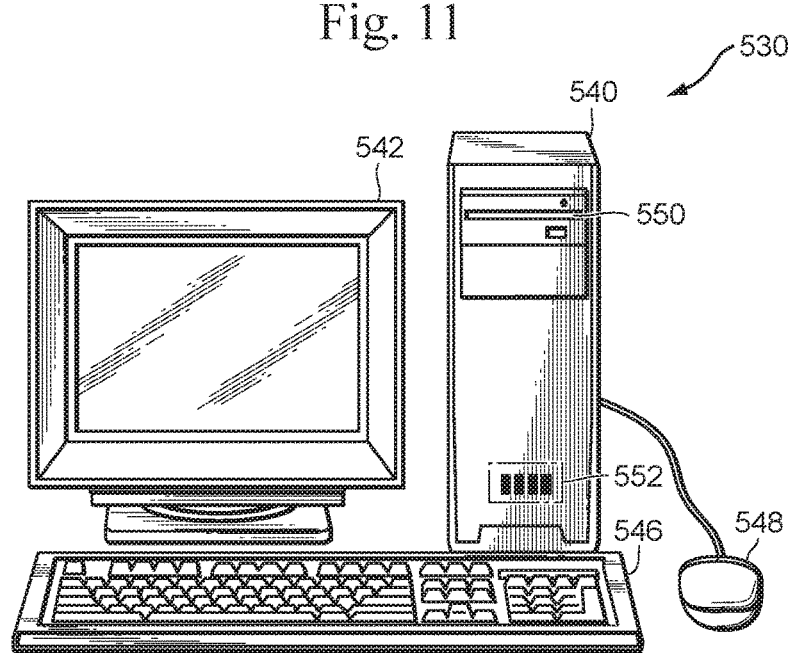
FIG. 11 shows an appearance of a computer system realizing the request paraphrasing system and the request paraphrasing model training device in accordance with the first embodiment.
Figure 12:
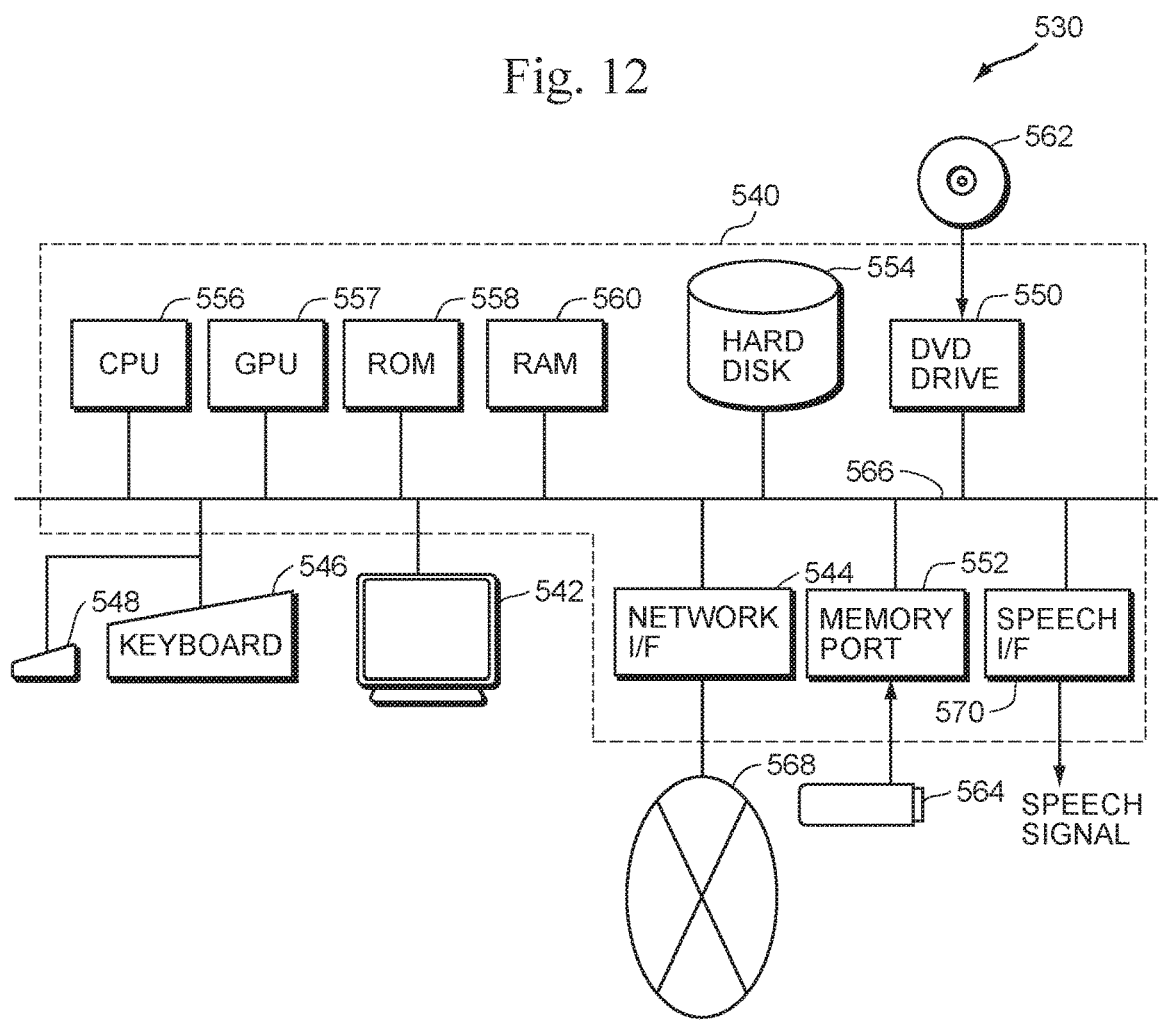
FIG. 12 is a block diagram showing an internal configuration of the computer shown in FIG. 11.

Training data storage unit 50, request candidate storage unit 52, question-answering system log storage unit 54, question-answering system 58, training unit 62, the first training data generating unit 64, the second training data generating unit 66, the third training data generating unit 68, neural paraphrasing model 94, classification model 98, training data adding device 320, training data storage unit 322, request determining model training device 324, request determining model 326, dialogue system 330, request paraphrasing model training system 400 and so on can each be realized by the computer hardware and computer program or programs executed by a CPU (Central Processing Unit) and GPU (Graphics Processing Unit) on the hardware. FIGS. 11 and 12 show computer hardware realizing the devices and systems mentioned above. A GPU is generally used for image processing, and a technique utilizing the GPU for common computing process is referred to as GPGPU (General-purpose computing on graphics processing unit). A GPU is capable of executing a plurality of operations of the same type simultaneously in parallel. In these premises, when a neural network is trained or tested, the calculations of weights for each node are simple product-sum operations and are often simultaneously executable. Therefore, the GPGPU is good for neural paraphrasing model 94 and classification model 98 shown in FIG. 2, request determining model 326 shown in FIG. 7 and request paraphrasing system 412 shown in FIG. 9.

Referring to FIG. 11, computer system 530 includes a computer 540 having a memory port 552 and a DVD (Digital Versatile Disc) drive 550, a keyboard 546, a mouse 548 and a monitor 542.

Referring to FIG. 12, in addition to memory port 552 and DVD drive 550, computer 540 includes a CPU 556 and GPU 557, a bus 566 connected to CPU 556, GPU 557, memory port 552 and DVD drive 550, a read-only memory (ROM) 558 for storing a boot program and the like, a random access memory (RAM) 560, which is a computer readable storage, connected to bus 566 and storing program instructions, a system program and work data, and a hard disk 554. Computer 540 further includes a network interface (I/F) 544 providing a connection to a network 568, enabling communication with other terminals, and a speech I/F 570 for speech signal input from/output to the outside, all connected to bus 566.

The program causing computer system 530 to function as various functional units of the devices and systems of the embodiments above is stored in a DVD 562 or a removable memory 564, both of which are computer readable storage media, loaded to DVD drive 550 or memory port 552, and transferred to hard disk 554. Alternatively, the program may be transmitted to computer 540 through network 568 and stored in hard disk 554. The program is loaded to RAM 560 at the time of execution. The program may be directly loaded to RAM 560 from DVD 562, removable memory 564, or through network 568. The data necessary for the process described above may be stored at a prescribed address of hard disk 554, RAM 560, or a register in CPU 556 or GPU 557, processed by CPU 556 or GPU 557, and stored at an address designated by the program. Parameters of neural paraphrasing model 94, classification model 98, request determining model 326 and request paraphrasing system 412 of which trainings are eventually completed may be stored, for example, in hard disk 554, or stored in DVD 562 or removable memory 564 through DVD drive 550 and memory port 552, respectively. Alternatively, these may be transmitted through network I/F 544 to another computer or a storage device connected to network 568.

The program includes an instruction sequence of a plurality of instructions causing computer 540 to function as various devices and systems in accordance with the embodiments above. The numerical value calculating process in the various devices and system described above are done by using CPU 556 and GPU 557. Though the process is possible by using CPU 556 only, GPU 557 realizes higher speed. Some of the basic functions necessary to cause the computer 540 to realize this operation are provided by the operating system running on computer 540, by a third party program, or by various dynamically linkable programming tool kits or program library, installed in computer 540. Therefore, the program itself may not necessarily include all of the functions necessary to realize the devices and method of the present embodiments. The program has only to include instructions to realize the functions of the above-described systems or devices by dynamically calling appropriate functions or appropriate program tools in a program tool kit or program library in a manner controlled to attain the desired results. Naturally, all the necessary functions may be provided by the program alone.

Effects of the Embodiments

The above-described embodiments expand the breadth of the acceptable inputs that can be addressed by existing question-answering systems or dialogue systems. Natural language inputs to the systems may be in various styles, including those comprised of only fragmental keywords commonly used as inputs to search engines, and those with colloquial expressions used in chatting. By using the request paraphrasing system in accordance with the embodiments above as pre-processing for the question-answering systems and the dialogue systems, it becomes possible to absorb such differences in styles. As a result, the request paraphrasing system described above can be used directly without necessitating any change to existing systems. Since it is unnecessary to present the results of paraphrasing to the user, the user is unaware of the request paraphrasing system.

The embodiments above do not limit input domains and accept natural language inputs of various styles including colloquial expressions. Therefore, it is particularly effective to use the request paraphrasing system and the request determining system in accordance with the embodiments above for the daily-use dialogue systems, such as a dialogue system for common households and an in-vehicle dialogue system. Further, the power of the embodiments will be best exhibited when connected to a system that provides appropriate information and operates in cooperation with a so-called IoT device and other software or knowledge database, rather than to a simple chatting system.

Neural paraphrasing model 94 used in the embodiments above has a configuration similar to that of a neural machine translation. The reason for this is that the lengths of the inputs to the input and output sentences are not fixed. The neural paraphrasing model 94, however, is not limited to such a model. Any machine learning model may be used provided that it accepts input and output sentences of unfixed length. Further, the convolutional neural network is used for classification model 98 of the first embodiment and for request determining model 326 of the second embodiment. The present invention, however, is not limited to such embodiments. A model that is trained through machine learning to determine whether or not an input sentence is a request, for example an SVM (Support Vector Machine), may be used. Other than the above, any currently available model or any model that will be available in the future that can be used as the neural paraphrasing model, the classification model and the request determining model of the present invention may be used.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a question-answering system using a computer, which is a complicated system including combinations of questions and possible answers, for a user to effectively navigate the question-answering system.

REFERENCE SIGNS LIST

50, 322 training data storage unit
52 request candidate storage unit
54 question-answering system log storage unit
56, 328 user input
58, 342 question-answering system
60 answer
62 training unit
64 first training data generating unit
66 second training data generating unit
68 third training data generating unit
92 paraphrasing model training unit
94 neural paraphrasing model
96 classification model training unit
98 classification model
120, 350, 412 request paraphrasing system
122, 352 question-answering device
130 pre-processing unit
140 word vector sequence
144 encoder
146 forward GRU sequence
148 backward GRU sequence
150 combining unit
152 intermediate node vector
154 decoder
156 word sequence
158 decoder input
160 attention layer
162 coefficient calculating unit
164 context vector generating unit
166 hidden state vector
168 context vector
170 pair
180 convolutional neural network
182 final layer
184 Softmax layer
190 input layer
192 convolutional layer 194 pooling layer
200 N gram
210 maximum element
220, 222 element
240, 244, 246, 250, 252, 254, 260, 264, 266, 270, 272, 274, 290, 292, 294, 296, 298, 300, 302, 304, 360, 362, 364, 366, 370, 372, 374, 376, 378, 380, 382, 450, 452, 454, 456, 458, 460, 462, 464, 470, 480, 482 step
242, 262 training process
320 training data adding device
324 request determining model training device
326 request determining model
330 dialogue system
332 response
340 request determining unit
344 separate responding system
346 selecting unit
400 request paraphrasing model training system
410 request
414 paraphrasing candidate storage unit
416 answer storage unit
418 answer evaluating unit
420 training data generating unit
466 process

The invention claimed is:

1. A system comprising:
one or more computer processors configured to:
morphologically analyze an input request and convert it to a morpheme sequence;
convert each word in the morpheme sequence to a word vector and thereby convert the morpheme sequence to an input word vector sequence;
output a classification code indicating one of a predetermined plurality of request classes to which the input request belongs;
receive the input word vector sequence and the classification code as inputs; and
convert, using a request paraphrasing model trained in advance, the input request represented by the input word vector sequence and the classification code indicating a class to which the input request belongs to an output word sequence, wherein:
the output word sequence corresponds to a request having a higher probability of getting a right response from a prescribed dialogue system than the input word vector sequence;
the output word sequence that is output from the request paraphrasing model is applied to the prescribed dialogue system as a request;
the classification code is output by using a classification model trained in advance using a plurality of training data items each including a first request, and a classification code indicating the class to which the first request belongs, the classification model being implemented by a convolutional neural network including multiple sets of layers, each set of layers comprising:
an input layer including multiple instances of a word vector sequence that are collectively represented as a matrix "T", wherein a number "M" feature maps are applied to the matrix T;
a convolutional layer; and
a pooling layer, wherein an element of each feature map is computed by applying a filter represented by $f_j$ ($1 \leq j \leq M$) to an "N"-gram comprised of consecutive "N" word vectors and "N" is an arbitrary natural number.

2. A computer-implemented method comprising:
receiving, by at least one computer processor, an input word vector sequence as an input;
outputting, by at least one computer processor configured to execute a request classification model, a classification code indicating one of a predetermined plurality of request classes to which the input word vector sequence belongs; and
converting, by at least one computer processor configured to execute a request paraphrasing model, a request represented by the input word vector sequence and the classification code of the request, to an output word sequence corresponding to a request having a higher probability of getting a right response from a prescribed dialogue system than the input word vector sequence;
storing, in a training data storage device, a plurality of training data items for training the request paraphrasing model, each of the plurality of training data items including a first request including a word sequence, a classification code indicating one of a plurality of request classes to which the first request belongs, and a second request including a word sequence as a paraphrase of the first request; and
training the request paraphrasing model, for each of the plurality of training data items stored in the training data storage device, using the first request and the classification code as inputs and the second request as teacher data, wherein:
a classification model is implemented by a convolutional neural network, the classification model including multiple sets of layers, each set of layers comprising:
an input layer including multiple instances of a word vector sequence that are collectively represented as a matrix "T", wherein a number "M" feature maps are applied to the matrix T;
a convolutional layer; and
a pooling layer, wherein an element of each feature map is computed by applying a filter represented by $f_j$ ($1 \leq j \leq M$) to an "N"-gram comprised of consecutive "N" word vectors and "N" is an arbitrary natural number.

3. A computer-implemented dialogue system including a question-answering system, a separate responding system, and a selecting unit, the computer-implemented dialogue system comprising:
one or more computer processors configured to:
determine if a natural language sentence is a request;
generate, using a classification model trained in advance if the natural language sentence is determined to be a request, a classification code indicating one of a plurality of request classes to which the request belongs;
paraphrase, using a request paraphrasing model trained in advance if the natural language sentence is determined to be a request, a request represented by the natural language sentence and the classification code to a request having a higher probability of getting a right response from the question-answering system than the natural language sentence;
generate, if the natural language sentence is determined to be a request, an answer to the request by inputting the request having a higher probability of getting a right response to the question-answering system, wherein:
the classification model is implemented by a convolutional neural network trained in advance using a plurality of training data items each including a first request and a classification code indicating a class to which the first request belongs, and the convolutional neural network includes multiple sets of layers, each set of layers comprising:
- an input layer including multiple instances of word vectors in the natural language sentence that are collectively represented as a matrix "T", wherein a number "M" feature maps of feature map "O" are applied to the matrix T;
- a convolutional layer; and
- a pooling layer, wherein an element of each feature map "O" is computed by applying a filter represented by $f_j$ ($1 \leq j \leq M$) to an "N"-gram comprised of consecutive "N" word vectors and "N" is an arbitrary natural number and "O" is calculated using an equation of $O = f(W_{fj} \cdot x_{i,j:N-1} + b_{ij})$, where weight $W_{fj}$ is a real matrix of d×N dimensions, bias $b_{ij}$ is a real number, and "·" represents an elementwise multiplication followed by summation of results produced by the elementwise multiplication, and $f(x) = \max(0, x)$ (normalized linear function);

generate, using the separate responding system if the natural language sentence is determined not to be a request, an appropriate response to the natural language sentence; and select, using the selecting unit, either an answer output from the question-answering system or the appropriate response generated by the separate responding system based on whether the natural language sentence is determined to be a request.

* * * * *